United States Patent
Mukai et al.

(10) Patent No.: US 9,079,418 B2
(45) Date of Patent: Jul. 14, 2015

(54) TREATMENT LIQUID FOR PLASTIC FILM, PRIMER LIQUID FOR PRINTING, INK COMPOSITION, AND METHOD FOR INK JET RECORDING USING THEM

(75) Inventors: Hiroshi Mukai, Nagano-Ken (JP); Kiyohiko Takemoto, Nagano-Ken (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/093,874

(22) Filed: Apr. 26, 2011

(65) Prior Publication Data

US 2011/0200799 A1  Aug. 18, 2011

Related U.S. Application Data

(62) Division of application No. 11/883,414, filed as application No. PCT/JP2006/306855 on Mar. 31, 2006.

(30) Foreign Application Priority Data

| Mar. 31, 2005 | (JP) | 2005-102713 |
|---|---|---|
| Mar. 31, 2005 | (JP) | 2005-103116 |
| Mar. 31, 2005 | (JP) | 2005-103686 |
| Mar. 31, 2005 | (JP) | 2005-103733 |
| Mar. 31, 2005 | (JP) | 2005-103767 |
| Mar. 31, 2005 | (JP) | 2005-103806 |

(51) Int. Cl.
| B32B 33/00 | (2006.01) |
| B41J 2/21 | (2006.01) |
| B41M 5/00 | (2006.01) |
| C09D 5/00 | (2006.01) |
| C09D 11/38 | (2014.01) |
| C09D 11/54 | (2014.01) |
| B41M 7/00 | (2006.01) |

(52) U.S. Cl.
CPC .......... *B41J 2/2114* (2013.01); *B41M 5/0011* (2013.01); *B41M 5/0047* (2013.01); *B41M 5/0064* (2013.01); *C09D 5/002* (2013.01); *C09D 11/38* (2013.01); *C09D 11/54* (2013.01); *B41M 7/009* (2013.01); *Y10T 428/24802* (2015.01)

(58) Field of Classification Search
CPC .... B41M 5/0011; B41M 5/0064; C09D 5/002
USPC .................................................. 523/160, 161
See application file for complete search history.

(56) References Cited

U.S. PATENT DOCUMENTS

| 4,166,044 A | 8/1979 | Germonprez et al. |
| 5,223,026 A | 6/1993 | Schwarz, Jr. |
| 5,300,143 A | 4/1994 | Schwarz, Jr. |
| 5,707,647 A | 1/1998 | Dunn et al. |
| 5,717,030 A | 2/1998 | Dunn et al. |
| 5,954,866 A * | 9/1999 | Ohta et al. ................. 106/31.89 |
| 5,993,524 A | 11/1999 | Nagai et al. |
| 6,011,098 A | 1/2000 | Kashiwazak et al. |
| 6,087,416 A | 7/2000 | Pearlstine et al. |
| 6,541,538 B1 * | 4/2003 | Matzinger et al. ............ 523/160 |
| 6,737,449 B1 | 5/2004 | Yatake |
| 6,848,777 B2 | 2/2005 | Chen |
| 6,863,391 B2 | 3/2005 | Tomioka et al. |
| 7,040,747 B2 | 5/2006 | Kuboto |
| 7,338,988 B2 | 3/2008 | Hesler et al. |
| 7,922,315 B2 | 4/2011 | Isobe |
| 8,076,394 B2 | 12/2011 | Kabalnov |
| 8,629,198 B2 | 1/2014 | Isobe et al. |
| 2002/0187310 A1 | 12/2002 | Kabalnov |
| 2003/0052952 A1* | 3/2003 | Tanabe et al. ................. 347/100 |
| 2004/0146726 A1 | 7/2004 | Heckes et al. |
| 2004/0207701 A1 | 10/2004 | Linuma |
| 2004/0244645 A1 | 12/2004 | Doi et al. |
| 2005/0007431 A1 | 1/2005 | Koyano et al. |
| 2005/0012798 A1 | 1/2005 | Adachi et al. |
| 2005/0052515 A1 | 3/2005 | Udagawa et al. |
| 2005/0129879 A1 | 6/2005 | Bodis |
| 2008/0152825 A1 | 6/2008 | Mukai et al. |
| 2010/0110121 A1 | 5/2010 | Isobe |
| 2010/0110122 A1 | 5/2010 | Isobe |
| 2011/0200797 A1 | 8/2011 | Mukai et al. |
| 2011/0200798 A1 | 8/2011 | Mukai et al. |
| 2011/0200799 A1 | 8/2011 | Mukai et al. |
| 2013/0101810 A1 | 4/2013 | Mukai et al. |

FOREIGN PATENT DOCUMENTS

| EP | 0 979 847 A1 | 2/2000 |
| EP | 0 979 847 A1 | 2/2000 |
| EP | 1 134 265 A2 | 9/2001 |
| EP | 1 134 265 A2 | 9/2001 |
| EP | 1 420 052 A1 | 5/2004 |
| EP | 1420052 | 5/2004 |
| EP | 1 547 793 A1 | 6/2005 |
| JP | 49-19175 | 5/1974 |
| JP | 05-194886 | 8/1993 |
| JP | 07-109430 | 4/1995 |

(Continued)

OTHER PUBLICATIONS

English Abstract of WO01-08895A Published Feb. 8, 2001.

(Continued)

*Primary Examiner* — Doris Lee

(74) *Attorney, Agent, or Firm* — Harness, Dickey & Pierce, P.L.C.

(57) ABSTRACT

This invention provides a treatment liquid for an ink jet recording medium having a recording face of a plastic film, wherein the treatment liquid including at least a specific cyclic ester compound or a specific cyclic amide compound, a primer liquid for printing, and an ink composition. According to the present invention, a plastic recorded matter possessing excellent adhesion and waterfastness can be formed on a recording medium having a recording face of a plastic film.

17 Claims, No Drawings

(56) References Cited

FOREIGN PATENT DOCUMENTS

| JP | 09-511666 A | 11/1997 |
|---|---|---|
| JP | 10-072561 | 3/1998 |
| JP | 10-086359 | 4/1998 |
| JP | 10-219169 | 8/1998 |
| JP | 0-287837 A | 10/1998 |
| JP | 10-272827 | 10/1998 |
| JP | 11-078211 | 3/1999 |
| JP | 11-314449 | 11/1999 |
| JP | 2000-044858 A | 2/2000 |
| JP | 2000-044858 A | 2/2000 |
| JP | 2000-168227 | 6/2000 |
| JP | 2000-168227 A | 6/2000 |
| JP | 2001-152058 | 6/2001 |
| JP | 2001-226617 | 8/2001 |
| JP | 2001-322346 | 11/2001 |
| JP | 2002-509957 A | 4/2002 |
| JP | 2002-509976 A | 4/2002 |
| JP | 2002-160072 | 6/2002 |
| JP | 2003-011486 | 1/2003 |
| JP | 2003-025709 A | 1/2003 |
| JP | 2003-503535 A | 1/2003 |
| JP | 2003-039811 | 2/2003 |
| JP | 2003-054115 A | 2/2003 |
| JP | 2004-9463 | 1/2004 |
| JP | 2004-009463 | 1/2004 |
| JP | 2004-009463 A | 1/2004 |
| JP | 2004-114692 A | 4/2004 |
| JP | 2004-155868 | 6/2004 |
| JP | 2004-195836 | 7/2004 |
| JP | 2004-195836 A | 7/2004 |
| JP | 2004-204070 | 7/2004 |
| JP | 2004-330695 | 11/2004 |
| JP | 2004-338361 | 12/2004 |
| JP | 2004-346159 | 12/2004 |
| JP | 2004-352856 | 12/2004 |
| JP | 2005-1182 | 1/2005 |
| JP | 2005-1183 | 1/2005 |
| JP | 2005-015672 A | 1/2005 |
| JP | 2005-138503 | 6/2005 |
| JP | 2005-248006 A | 9/2005 |
| JP | 2011-194894 A | 10/2011 |
| WO | 95-028124 A | 10/1995 |
| WO | WO-99-50326 A1 | 10/1999 |
| WO | WO-99-50365 A1 | 10/1999 |
| WO | WO-00-78876 A1 | 12/2000 |
| WO | 01-08895 A | 2/2001 |
| WO | 03/097371 A1 | 11/2003 |
| WO | WO-03-097371 A1 | 11/2003 |
| WO | 2004/080723 | 9/2004 |
| WO | 2006/004006 A1 | 1/2006 |

OTHER PUBLICATIONS

English Abstract of Japanese Application 2005-015672A Published Jan. 20, 2005.
English Abstract of Japanese Application 2000-168227A Published Jun. 20, 2000.
English Abstract of Japanese Application 2005-248006A Published Sep. 15, 2005.
English Abstract of Japanese Application 10-287837A Published Oct. 27, 1998.
Patent Abstracts of Japan of JP 2004-195836 Dated Jul. 15, 2004.
Patent Abstracts of Japan of JP 11-078211 Dated Mar. 23, 1999.
Patent Abstracts of Japan of 10-272827 Dated Oct. 13, 1998.
Patent Abstracts of Japan of 10-086359 Dated Apr. 7, 1998.
Patent Abstracts of Japan of 2001-226617 Dated Aug. 21, 2001.
Patent Abstracts of Japan of 2003-011486 Dated Jan. 15, 2003.
Patent Abstracts of Japan of 2003-039811 Dated Feb. 13, 2003.
Patent Abstracts of Japan of 2004-009463 Dated Jan. 15, 2004.
Patent Abstracts of Japan of 2005-138503 Dated Jun. 2, 2005.
Patent Abstracts of Japan and JPO Computer English Translation of JP 2004-155868 Dated Jun. 3, 2004.
Patent Abstracts of Japan and JPO Computer English Translation of JP 2004-330695 Dated Nov. 25, 2004.
Patent Abstracts of Japan and JPO Computer English Translation of JP 11-314449 Dated Nov. 16, 1999.
Patent Abstracts of Japan and JPO Computer English Translation 2001-322346 dated Nov. 20, 2001.
Patent Abstracts of Japan and JPO Computer English 07-109430 Dated Apr. 25, 1995.
Patent Abstracts of Japan and JPO Computer English 2004-204070 Dated Jul. 22, 2004.
Patent Abstracts of Japan and JPO Computer English Translation of JP 2004-346159 Dated Dec. 9, 2004.
Patent Abstracts of Japan and JPO Computer English Translation of JP 2004-856 Dated Dec. 16, 2004.
Patent Abstracts of Japan and JPO Computer English Translation of JP 1600072 Dated Jun. 4, 2002.
Patent Abstracts of Japan and JPO Computer English Translation of JP 2002-160072 Dated Jun. 4, 2002.
Patent Abstracts of Japan and JPO Computer English Translation of JP 2004-352856 Dated Dec. 16, 2004.
Patent Abstracts of Japan and JPO Computer English Translation of JP 2002-146255 Dated May 22, 2002.
Patent Abstracts of Japan and JPO Computer English Translation of JP 2002-371212 Dated Dec. 26, 2002.
English Abstract of Japan Application No. 2004-94623 Published Jun. 23, 2005.
English Abstract of Japanese Application No. 2004-195836 Published Jul. 15, 2004.
English Abstract of Japanese Application No. 2005-1182 Published Jan. 6, 2005.
Patent Abstract of Japan of JP 2000-168227 Dated Jun. 20, 2000.
Patent Abstract of Japan of JP 10-219169 Dated Aug. 18, 1998.
Patent Abstract of Japan of JP 2001-152058 Dated Jun. 5, 2001.
English Abstract of Japanese Application 2000-044858A Published Feb. 15, 2000.
English Abstract of Japanese Application 2004-114692A Published Apr. 15, 2004.
European Search Report Application 11004312.2 Issued Nov. 15, 2011.
Supplementary European Search Report Application 06730803.1 Issued Nov. 15, 2011.
Extended European Search Report for Application No. EP 13 00 0079 mailed Feb. 13, 2013 (5 pages).

* cited by examiner

TREATMENT LIQUID FOR PLASTIC FILM, PRIMER LIQUID FOR PRINTING, INK COMPOSITION, AND METHOD FOR INK JET RECORDING USING THEM

CROSS-REFERENCE TO RELATED APPLICATIONS

This application is a divisional of U.S. patent application Ser. No. 11/883,414 filed Jul. 31, 2007, which is national phase of PCT Application JP2006/306855 filed on Mar. 31, 2006, which claimed the benefit of the following Japanese Patent Applications: 103116/2005 filed Mar. 31, 2005, 103686/2005 filed Mar. 31, 2005, 103806/2005 filed Mar. 31, 2005, 102713/2005 filed Mar. 31, 2005, 103733/2005 filed Mar. 31, 2005, and 103767/2005 filed Mar. 31, 2005, the contents of which are incorporated herein by reference.

BACKGROUND OF THE INVENTION

1. Field of Invention

The present invention relates to a treatment liquid for a plastic film. More particularly, the present invention relates to a treatment liquid composition to be used in the printing of a water-based ink composition on a recording medium having a recording face formed of a plastic film, which treatment liquid composition is coated onto the recording face before printing of a water-based ink composition. The present invention also relates to a primer liquid to be used for printing for a plastic film. More particularly, the present invention relates to a primer liquid composition to be used in the printing of a water-based ink composition on a recording medium having a recording face formed of a plastic film, which primer liquid composition can be coated onto the recording face before printing of a water-based ink composition to form a primer film. Further, the present invention relates to an ink composition for a plastic film. More particularly, the present invention relates to an ink composition suitable for use for an ink jet recording medium having a recording face formed of a plastic film. Furthermore, the present invention relates to an ink jet recording method using the above treatment liquid, primer liquid, or ink composition.

2. Background Art

An ink jet recording method is a printing method in which droplets of an ink composition are flied to and deposited onto a recording medium in its recording face to perform printing. This method has a feature that high-resolution and high-quality images can be printed at a high speed with a relatively inexpensive apparatus. Regarding recording media for ink jet recording, there is an increasing demand for proper properties of materials constituting the recording media, for those of commonly used papers and the like, as well as plastic films.

Plastic recorded matters produced by printing onto plastic films or the like are expected to be used in applications for which paper cannot be used, for example, outdoor signs. Accordingly, higher waterfastness and lightfastness are required of plastic recorded matters. Also regarding prints such as labels which are touched by the hand, plastic recorded matters are more suitable than paper printed matters. Also in this case, fastness properties such as fastness to rubbing/scratch are required of the recorded matters.

When ink jet recording is carried out using non-surface-treated plastic films for ink jet recording as an ink jet recording medium, for example, non-surface-treated polyvinyl chloride films, solvent-type inks, UV-curable inks, or two-component-type curable inks have hitherto been used. Solvent-type inks, however, emit odor of solvents, and, in some cases, harmful components are contained in the solvent volatile component. Also for UV curable inks, two-component-type curable inks and the like, in some cases, the curable monomer used contains harmful components.

When ink jet recording is carried out using a conventional water-based ink on a non-surface-treated plastic film for ink jet recording, recorded images are unsatisfactory in adhesion, scratch resistance and waterfastness.

Regarding the use of plastic films for ink jet recording, Japanese Patent Laid-Open Publication No. 286940/1997 proposes a method in which a colorant or a dispersing resin as the ink component is coagulated and cured using a water-based ink.

Further, for example, Japanese Patent Laid-Open Publication No. 11486/2003 discloses an ink jet recording method using a pretreatment liquid. This recording method, however, aims to record high-quality and waterfast images on commonly used recording media but does not aim at printing on plastic films. Furthermore, for example, Japanese Patent Laid-Open Publication No. 114140/1998 describes that an amide-containing reaction solution is used in an ink jet recording method using two liquids. In this reaction liquid, the amide is added from the viewpoint of improving print quality and print stability, and this publication does not suggest printing onto plastic films.

On the other hand, for example, Japanese Patent Laid-Open Publication No. 103785/2002 discloses that, in an ink composition for ink jet recording, lactams or lactones can be used as carrier medium materials (see, for example, claim 12 and the like in this publication). This publication, however, describes lactams and lactones only as an example of solvents for dissolving a colorant in an ink composition and does not suggest printing of the ink composition onto a recording medium having a recording face formed of a plastic film.

Further, Japanese Patent Laid-Open Publication No. 48934/2001 discloses an ink composition containing a cyclic amide compound, and Japanese Patent Laid-Open Publication No. 96345/2003 discloses that 2-pyrrolidone, caprolactam and the like are usable as wetting agents in ink compositions. These publications, however, do not suggest advantageous printing of an ink composition onto a recording medium having a recording face formed of a plastic film.

Accordingly, the development of an ink jet recording method using a water-based pigment ink, which can produce plastic recorded matters having excellent waterfastness and rubbing resistance, has been desired.

SUMMARY OF THE INVENTION

The present inventors have now found that plastic recorded matters having significantly improved rubbing resistance, scratch resistance, and waterfastness can be produced by treating the surface of a plastic film on its recording face, that is, by previously coating a specific cyclic ester compound- or specific cyclic amide compound-containing treatment liquid having a specific composition onto the recording face, prior to the deposition, onto the recording face, of a thermoplastic resin-containing water-based ink composition which can be brought to a film upon heating.

The present inventors have further found that, when plastic recorded matters are formed by depositing an ink composition, plastic recorded matters having significantly improved rubbing resistance, scratch resistance, and waterfastness can be produced by previously coating a specific cyclic ester compound- or specific cyclic amide compound-containing primer liquid having a specific composition onto the surface of a plastic film to treat the surface of the plastic film and, at the same time, to form a primer film on the plastic film, prior to the deposition of the ink composition.

The present inventors have further found that, when ink jet recording is carried out on a recording medium having a recording face formed of a plastic film, recorded matters having significantly improved waterfastness and adhesion between the recording medium and the ink composition can be formed by using a specific solvent-containing ink composition having a specific composition. Regarding the solvent used, the use of a low-volatility cyclic ester compound or cyclic amide compound in combination with a high-volatility cyclic ether compound is more useful for achieving the above improvement.

The present invention has been made based on such finding.

Accordingly, an object of the present invention is to provide a treatment liquid for a plastic film that, when used with a water-based ink composition containing a thermoplastic resin, can realize the formation of a plastic recorded matter possessing excellent rubbing resistance, scratch resistance, and waterfastness. Another object of the present invention is to provide an ink jet recording method that can form a plastic printed matter possessing excellent rubbing resistance, scratch resistance, and waterfastness using the treatment liquid and the water-based ink composition.

Still another object of the present invention is to provide a primer liquid for printing for a plastic film that can realize the formation of a primer film having high adhesion to an ink composition deposited to form a plastic recorded matter possessing excellent rubbing resistance, scratch resistance and waterfastness. A further object of the present invention is to provide an ink jet recording method using the primer liquid.

Another object of the present invention is to provide an ink composition for ink jet recording that can form a plastic recorded matter possessing excellent adhesion and waterfastness on a recording medium having a recording face formed of a plastic film. Still another object of the present invention is to provide an ink jet recording method using the ink composition.

According to one aspect of the present invention, there is provided a treatment liquid for an ink jet recording medium having a recording face formed of a plastic film, wherein said treatment liquid comprising at least
a heterocyclic ketone compound selected from the group consisting of cyclic ester compounds of formula (1), cyclic amide compound of formula (2), and a combination thereof, and
a main solvent:

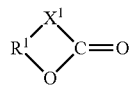
(1)

wherein
$R^1$ represents a straight chain or branched chain C2 to C12 saturated hydrocarbon chain, and
$X^1$ represents —$CH_2$— or —O—; and

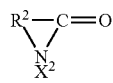
(2)

wherein
$R^2$ represents a straight chain or branched chain C2 to C12 saturated hydrocarbon chain, and $X^2$ represents a hydrogen atom or a straight chain or branched chain C1 to C6 alkyl group.

In one preferred embodiment of the present invention, the treatment liquid comprises at least a cyclic ester compound of formula (1) and a main solvent.

In one preferred embodiment of the present invention, the treatment liquid comprises at least a cyclic amide compound of formula (2) and a main solvent.

In a preferred embodiment of the present invention, the main solvent in the treatment liquid is water.

Further, in a preferred embodiment of the present invention, the treatment liquid further comprises a surfactant and/or an organic solvent having low surface tension.

According to the present invention, there is provided a method for ink jet recording, comprising coating a treatment liquid onto a recording medium having a recording face formed of a plastic film, then ejecting droplets of an ink composition and depositing the droplets onto the recording face to perform printing, wherein said treatment liquid is a treatment liquid for a plastic film according to the present invention, and said ink composition is a water-based pigment ink composition comprising at least a pigment, a thermoplastic resin, and water.

According to a second aspect of the present invention, there is provided a primer liquid for printing on an ink jet recording medium having a recording face formed of a plastic film, wherein said primer liquid comprising at least
a heterocyclic ketone compound selected from the group consisting of cyclic ester compounds of formula (1), cyclic amide compound of formula (2), and a combination thereof,
a thermoplastic resin, and
a main solvent,
said thermoplastic resin being dispersed in said primer liquid.

In one preferred embodiment of the present invention, the primer liquid for printing comprises at least a cyclic ester compound of formula (1), a thermoplastic resin, and a main solvent, the thermoplastic resin being dispersed in the primer liquid.

In one preferred embodiment of the present invention, the primer liquid for printing comprises at least a cyclic amide compound of formula (2), a thermoplastic resin, and a main solvent, the thermoplastic resin being dispersed in the primer liquid.

In a preferred embodiment of the present invention, the main solvent in the primer liquid is water.

Further, in a preferred embodiment of the present invention, the primer liquid further comprises a surfactant and/or an organic solvent having low surface tension.

According to the present invention, there is provided a set for ink jet recording, comprising a water-based pigment ink composition comprising at least a primer liquid according to the present invention, a pigment, a thermoplastic resin, and water.

According to the present invention, there is provided a method for ink jet recording, comprising coating a primer liquid onto a recording medium having a recording face formed of a plastic film to form a primer film and then ejecting and depositing droplets of an ink composition onto the primer film to perform printing, wherein said primer liquid is a primer liquid for printing according to the present invention, and said ink composition is a water-based pigment ink composition comprising at least a pigment, a thermoplastic resin, and water.

According to a third aspect of the present invention, there is provided an ink composition for an ink jet recording medium having a recording face formed of a plastic film, wherein said ink composition comprising
a heterocyclic ketone compound selected from the group consisting of cyclic ester compounds of formula (1), cyclic amide compound of formula (2), and a combination thereof,
a thermoplastic resin,
a colorant,
and
a main solvent,
said thermoplastic resin being dispersed in said ink composition.

In a preferred embodiment of the present invention, the ink composition further comprises a cyclic ether compound of formula (3):

(3)

wherein
R' represents a straight chain or branched chain C2 to C12 saturated hydrocarbon chain or a straight chain or branched chain C2 to C12 saturated ether chain.

In a preferred embodiment of the present invention in the ink composition, the colorant is a pigment and is dispersed in the ink composition.

In a preferred embodiment of the present invention, the main solvent in the ink composition is water.

Further, in a preferred embodiment of the present invention, the ink composition further comprises a surfactant and/or a low-surface tension organic solvent.

According to the present invention, there is provided a method for ink jet recording, characterized by comprising ejecting and depositing droplets of an ink composition onto a recording medium having a recording face of a plastic film to perform printing, wherein said ink composition is an ink composition according to the present invention.

DETAILED DESCRIPTION OF THE INVENTION

I. Treatment Liquid

According to one aspect of the present invention, there is provided a treatment liquid for an ink jet recording medium having a recording face formed of a plastic film.

As described above, the treatment liquid according to the present invention is a treatment liquid for an ink jet recording medium having a recording face formed of a plastic film and comprises at least a heterocyclic ketone compound selected from the group consisting of cyclic ester compounds of formula (1), cyclic amide compound of formula (2), and a combination thereof and a main solvent. As described below, the main solvent is preferably water. Preferably, the treatment liquid according to the present invention further comprises a surfactant and/or a low-surface tension organic solvent. More preferably, the treatment liquid according to the present invention further comprises a surfactant or further comprises a surfactant and a low-surface tension organic solvent. Further, preferably, the treatment liquid according to the present invention is coated onto the recording medium by ink jet recording.

The treatment liquid according to the present invention is used for printing on a recording face formed of a plastic film.

In the present invention, recording media having a recording face formed of a plastic film include plastic films which per se constitute the recording medium, and, further, recording media comprising a plastic coated onto conventional recording medium base materials such as paper, and recording media comprising a plastic film bonded onto the base material.

Further, in the present invention, the plastic is not particularly limited so far as it is dissolved in or can be brought to a wetted state by a heterocyclic ketone compound. Examples thereof include polyvinyl chloride, polyethylene terephthalate (PET), polycarbonate, polystyrene, and polyurethane. In the present invention, the plastic is preferably polyvinyl chloride.

The treatment liquid according to the present invention can be used for printing on non-surface-treated plastic films for ink jet printing, as well as surface-treated plastic films for ink jet printing.

The treatment liquid according to the present invention, when used with the water-based ink composition comprising the thermoplastic resin, can form a plastic recorded matter possessing excellent rubbing resistance, scratch resistance, and waterfastness. In this case, the ink composition is a water-based pigment ink composition comprising at least a pigment, a thermoplastic resin, and water. Therefore, in the present invention, since a pigment-type water-based ink composition can be used, recorded matters possessing excellent lightfastness can be formed on plastic films The reason for which the desired effect can be attained by the present invention is considered as follows. However, it should be noted that the following reason is hypothetical and should not be construed as limiting the present invention.

Upon coating onto a plastic film, the treatment liquid according to the present invention is spread evenly on the surface of the plastic film. When water is evaporated in this state, the heterocyclic ketone compound can be allowed to stay homogeneously in a high concentration on the surface of the plastic film. Consequently, it is considered that the heterocyclic ketone compound can bring a very shallow part from the surface of the plastic film to a dissolved or wetted state. Thereafter, when a water-based ink containing a resin which can be brought to a film upon heating is deposited on the coating followed by curing of the resin contained in the water-based ink to form a film, it is considered that a layer formed of a mixture of the resin contained in the water-based ink with the plastic is formed at the interface of the cured film and the plastic. It is considered that, since this mixed layer is integral with the plastic as well as with the film formed by curing of the resin contained in the ink, the adhesion between the ink layer and the plastic surface can be significantly improved. The enhanced adhesion can substantially prevent the separation of the film caused, for example, by external force such as friction or the entry of water into the interface and thus can realize the formation of plastic recorded matters possessing excellent rubbing resistance, scratch resistance and water resistance. Thus, the preparation of strong printed matters utilizing the durability of the plastic film per se can be realized.

In the treatment liquid according to the present invention, preferably, since the heterocyclic ketone compound, which is a component capable of dissolving the plastic, has been diluted with water, there is substantially no possibility that the treatment liquid breaks or damage members constituting the printer with which the liquid comes into contact. Further, since a preferred treatment liquid according to the present invention is in an aqueous solution form, the treatment liquid per se and vapor generated from the treatment liquid are also highly safe.

I-1. Heterocyclic Ketone Compound

The treatment liquid according to the present invention comprises a heterocyclic ketone compound as an indispensable component.

The term "heterocyclic ketone compound" as used herein refers to a heterocyclic ketone compound selected from the group consisting of cyclic ester compounds of formula (1), cyclic amide compounds of formula (2), and a combination thereof. Accordingly, the heterocyclic ketone compound may be, for example, any one of or a combination of a plurality of compounds belonging to the cyclic ester compounds of formula (1) or alternatively may be a combination of a compound selected from cyclic ester compounds of formula (1) with a compound selected from cyclic amide compound of formula (2). In a preferred embodiment of the present invention, the heterocyclic ketone compound is either a cyclic ester compound of formula (1) or a cyclic amide compound of formula (2).

I-1-1. Cyclic Ester Compound

In formula (1), as described above, $R^1$ represents a straight chain or branched chain C2 to C12 saturated hydrocarbon chain, and $X^1$ represents —$CH_2$— or —O—. $R^1$ preferably represents C2 to C8, more preferably C2 to C5, still more preferably C2 to C4, saturated hydrocarbon chain. Here, for example, "C2 to C12" in "C2 to C12 saturated hydrocarbon chain" means that the number of carbon atoms in the saturated hydrocarbon chain is 2 to 12.

In formula (1), the straight chain C2 to C12 saturated hydrocarbon chain refers to a chain represented by —($CH_2$)m- wherein m is an integer of 2 to 12. The branched chain C2 to C12 saturated hydrocarbon chain refers to a chain, represented by —($CH_2$)n-, having a side chain(s) provided by substituting a hydrogen atom(s) on the carbon atom by one or more alkyl groups so that the total number of carbon atoms is p, provided that n+p, wherein p represents the total number of carbon atoms on all the side chains is an integer of 2 to 12. Such alkyl substituents include, for example, methyl, ethyl, propyl, isopropyl, butyl, isobutyl, s-butyl, and t-butyl. The saturated hydrocarbon chain on the straight chain or branched chain may if necessary be further substituted, for example, by a hydroxyl group or hydroxymethylene.

Specific examples of straight chain or branched chain C2 to C12 saturated hydrocarbon chains include ethylene and propylene.

Specific examples of cyclic ester compounds include γ-butyrolactone, ε-caprolactone, δ-hexanolactone, propylene carbonate, ethylene carbonate, and 1,3-dioxan-2-one. The cyclic ester compound is preferably selected from the group consisting of γ-butyrolactone, ε-caprolactone, propylene carbonate, and ethylene carbonate. More preferably, the cyclic ester compound is γ-butyrolactone or propylene carbonate.

In the present invention, one cyclic ester compound or a mixture of at least two cyclic ester compounds may be used. The cyclic ester compound used in the present invention may if necessary be synthesized, or alternatively may be a commercially available product.

I-1-2. Cyclic Amide Compound

In formula (2), as described above, $R^2$ represents a straight chain or branched chain C2 to C12 saturated hydrocarbon chain, and $X^2$ represents a hydrogen atom or a straight chain or branched chain C1 to C6 alkyl group.

$R^2$ preferably represents C2 to C8, more preferably C2 to C5, still more preferably C2 to C4, saturated hydrocarbon chain. Here, for example, "C2 to C12" in "C2 to C12 saturated hydrocarbon chain" means that the number of carbon atoms in the saturated hydrocarbon chain is 2 to 12.

In formula (2), the straight chain C2 to C12 saturated hydrocarbon chain refers to a chain represented by —($CH_2$)m- wherein m is an integer of 2 to 12. The branched chain C2 to C12 saturated hydrocarbon chain refers to a chain, represented by —($CH_2$)n-, having a side chain(s) provided by substituting a hydrogen atom(s) on the carbon atom by one or more alkyl groups so that the total number of carbon atoms is p, provided that n+p, wherein p represents the total number of carbon atoms on all the side chains, is an integer of 2 to 12. Such alkyl substituents include, for example, methyl, ethyl, propyl, isopropyl, butyl, isobutyl, s-butyl, and t-butyl. The saturated hydrocarbon chain on the straight chain or branched chain may if necessary be further substituted, for example, by a hydroxyl group or hydroxymethylene.

Specific examples of straight chain or branched chain C2 to C12 saturated hydrocarbon chains include ethylene and propylene.

Here "C1 to C6" in the case of "C1 to C6 alkyl group" in the "straight chain or branched chain C1 to C6 alkyl group" means that the number of carbon atoms in the alkyl group is 1 to 6. Examples of alkyl groups include methyl, ethyl, propyl, isopropyl, butyl, isobutyl, s-butyl, t-butyl, pentyl, and hexyl groups.

In formula (2), "C1 to C6 alkyl" preferably represents a C1 to 4 alkyl group, more preferably a C1 to C3 alkyl group, still more preferably a methyl or ethyl group, particularly preferably a methyl group.

In a preferred embodiment of the present invention, in formula (2), $R^2$ represents a straight chain or branched chain C2 to C5 saturated hydrocarbon group and $X^2$ represents a hydrogen atom or a methyl group.

Specific examples of cyclic amide compounds include 2-pyrrolidone, N-methyl-2-pyrrolidone, 5-methyl-2-pyrrolidone, δ-valerolactam, and ε-caprolactam. The cyclic amide compound is preferably selected from the group consisting of 2-pyrrolidone, N-methyl-2-pyrrolidone, and ε-caprolactam.

In a preferred embodiment of the present invention, at least two cyclic amide compounds of formula (2) are used. The separation or crystallization of the cyclic amide compound in the course of the evaporation of the solvent in the treatment liquid can be prevented by using two or more cyclic amide compounds. The use of two or more cyclic amide compounds can enhance the solubility of the cyclic amide compound in the treatment liquid solvent and can prevent the occurrence of an unfavorable phenomenon that the cyclic amide compound is present unevenly on the surface of the plastic and, consequently, the capability of dissolving the plastic is partially changed.

Specific preferred examples of the use of two or more cyclic amide compounds include a combination of 2-pyrrolidone with ε-caprolactam, a combination of N-methyl-2-pyrrolidone with ε-caprolactam, a combination of 2-pyrrolidone with N-methyl-2-pyrrolidone, and a combination of 2-pyrrolidone with N-methyl-2-pyrrolidone and ε-caprolactam.

The cyclic amide compound used in the present invention may if necessary be synthesized or alternatively may be a commercially available product.

The content of the heterocyclic ketone compound in the treatment liquid according to the present invention is not particularly limited so far as it can bring the treatment liquid to such concentration and surface tension that the treatment liquid can be coated evenly onto the recording medium, and there is no possibility that members constituting the printer with which the liquid comes into contact are not substantially broken or damaged. The content of the heterocyclic ketone compound is, for example, 0.1 to 50.0% by weight, preferably 5.0 to 30.0% by weight based on the total amount of the treatment liquid. When two or more cyclic amide compounds are used, the content refers to the total content of the two or more compounds. Further, this is true of the case where a combination of the cyclic ester compound and the cyclic amide compound is used.

I-2. Surfactant

The aqueous solution is usually repelled by plastics. Since, however, a surfactant and/or a low-surface tension organic solvent can be added to the treatment liquid according to the present invention, the heterocyclic ketone compound can be coated evenly on the plastic surface. It is considered that, upon the evaporation of water from the evenly coated treatment liquid, the heterocyclic ketone compound is fixed adequately on the surface of the plastic and can dissolve the plastic surface only in its desired area.

In the present invention, any of anionic, cationic, amphoteric and/or nonionic surfactants may be used.

Anionic surfactants include, for example, alkylsulfocarbonates, α-olefinsulfonates, polyoxyethylene alkyl ether acetates, N-acylamino acid and its salts, N-acylmethyltaurine salts, alkylsulfate polyoxyalkyl ether sulfates, alkylsulfate polyoxyethylene alkyl ether phosphates, rosin acid soaps, castor oil sulfuric ester salts, lauryl alcohol sulfuric ester salts, alkylphenol-type phosphotric acid esters, alkyl-type phosphoric acid esters, alkylarylsulfonic acid salts, diethylsulfosuccinic acid salts, diethylhexylsulfosuccinic acid salts, dioctylsulfosuccinic acid salts, and 2-vinylpyridine derivatives and poly-4-vinylpyridine derivatives.

Specific examples of amphoteric surfactants include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, and imidazoline derivatives.

Specific examples of nonionic surfactants usable herein include ether surfactants, such as polyoxyethylene nonylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether, polyoxyethyleneoleic acid ester, ester surfactants, such as polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate, or acetylene glycol surfactants represented by formula (i):

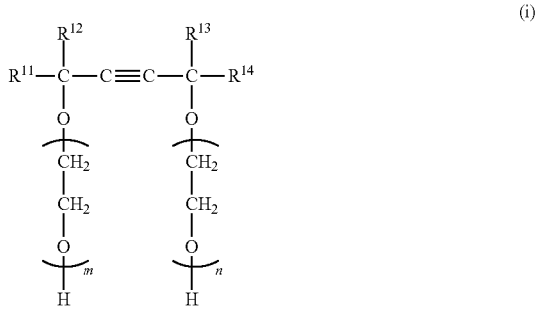

wherein $R^{11}$, $R^{12}$, $R^{13}$ and $R^{14}$ each independently represent an alkyl group having 1 to 6 carbon atoms; and n and m are each an integer which brings the sum of n and m to 0 to 30, for example, 2,4,7,9-tetramethyl-5-decyne-4,7-diol (for example, Surfynol 104, manufactured by Air Products and Chemicals. Inc.), 3,6-dimethyl-4-octyne-3,6-diol (for example, Surfynol 82, manufactured by Air Products and Chemicals. Inc.), and derivatives of these acetylene glycols (for example, Surfynol 465 and Surfynol 485 manufactured by Air Products and Chemicals. Inc.).

Among them, nonionic surfactants having good foaming properties or reliability of ejection through nozzles are preferred, and acetylene glycol surfactants are more preferred.

The content of the surfactant in the treatment liquid according to the present invention is not particularly limited so far as the heterocyclic ketone compound can be coated evenly on the plastic surface, and the content of the surfactant can be properly selected depending upon the type of the surfactant used and the type and amount of the heterocyclic ketone compound. The content of the surfactant may be, for example, 0.01 to 5.0% by weight, preferably 0.1 to 2.0% by weight, based on the total amount of the treatment liquid.

I-3. Low-Surface Tension Organic Solvent

In order to coat the heterocyclic ketone compound evenly on the plastic surface, the treatment liquid according to the present invention may contain a low-surface tension organic solvent instead of or in addition to the surfactant.

Examples of low-surface tension organic solvents include monohydric alcohols or polyhydric alcohol derivatives.

Monohydric alcohols particularly having 1 to 4 carbon atoms, for example, methanol, ethanol, n-propanol, i-propanol, or n-butanol, may be used as the monohydric alcohol.

In particular, full or partial ethers of a di- to tetrahydric alcohol having 2 to 6 carbon atoms and a lower alcohol having 1 to 4 carbon atoms may be used as the polyhydric alcohol derivative. The polyhydric alcohol derivative is an alcohol derivative, in which at least one hydroxyl group has been etherized, but does not mean etherized hydroxyl group-free polyhydric alcohol per se. The polyhydric alcohol lower alkyl ether which is preferred as the ether, is a compound represented by general formula (ii):

wherein $R^{21}$ and $R^{22}$ each independently represent a hydrogen atom or an alkyl group having 3 to 6 carbon atoms, preferably a butyl group; $R^{23}$ represents a hydrogen atom or a lower alkyl group having 1 to 4 carbon atoms, preferably a hydrogen atom or a methyl or ethyl group; and t is an integer of 1 to 8, preferably 1 to 4, provided that at least one of $R^{21}$ and $R^{22}$ is an alkyl group having 3 to 6 carbon atoms, preferably a butyl group.

Specific examples of polyhydric alcohol lower alkyl ethers include mono-, di- or triethylene glycol-mono- or dialkylene ether, and mono-, di- or tripropylene glycol-mono- or dialkyl ether. Preferred are triethylene glycol monobutyl ether, diethylene glycol monobutyl ether, diethylene glycol monopropyl ether, diethylene glycol monopentyl ether, and propylene glycol monobutyl ether.

In a preferred embodiment of the present invention, the low-surface tension organic solvent is diethylene glycol monobutyl ether or triethylene glycol monobutyl ether.

The content of the low-surface tension organic solvent in the treatment liquid according to the present invention is not particularly limited, so far as the heterocyclic ketone compound can be evenly coated onto the surface of plastic, and may be properly selected according to the heterocyclic ketone compound used and the kind and amount of the surfactant. The content of the low-surface tension organic solvent may be, for example, 0 to 25.0% by weight, preferably 2.0 to 15.0% by weight, based on the total amount of the treatment liquid.

Various properties of the treatment liquid according to the present invention can be properly regulated. In a preferred embodiment of the present invention, the viscosity of the treatment liquid is preferably not more than 25 mPa·sec, more preferably not more than 10 mPa·sec (25° C.). When the viscosity is in this range, the treatment liquid can be stably ejected through an ink ejection head. Further, the surface tension of the treatment liquid according to the present invention can be properly regulated and is preferably approximately in the range of 20.0 to 40.0 mN/m (25° C.), more preferably approximately in the range of 25.0 to 35.0 mN/m.

I-4. Main Solvent

The treatment liquid according to the present invention contains a main solvent. In order to coat a heterocyclic ketone compound-containing water-soluble component thinly and evenly on the surface of plastic, in the present invention, the heterocyclic ketone compound is diluted with a main solvent before coating. For example, water or a water-soluble organic solvent is usable as the main solvent. In the present invention, water is preferred, for example, from the viewpoint of safety.

Accordingly, in the treatment liquid according to the present invention, the main solvent is preferably water. Water may be pure water obtained by ion exchange, ultrafiltration, reverse osmosis, distillation or the like, or ultrapure water from the viewpoint of minimizing ionic impurities. Water, which has been sterilized, for example, by ultraviolet irradiation or by addition of hydrogen peroxide, is suitable, because this treatment can prevent the growth of mold or bacteria and, thus, the treatment liquid can be stored for a long period of time.

I-5. Other Ingredients

When the treatment liquid according to the present invention contains the above ingredients, a desired effect can be attained. If necessary, the treatment liquid may further comprise preservatives or fungicides, pH adjustors, dissolution aids, antioxidants, nozzle clogging preventive agents and the like.

pH adjustors include, for example, potassium dihydrogenphosphate or sodium dihydrogenphosphate. Specific examples of preservatives and fungicides include sodium benzoate, pentachlorophenol sodium, 2-pyridinethiol-1-oxide sodium, sodium sorbate, sodium dehydroacetate, and 1,2-dibenzisothiazolin-3-one (Proxel CRL, Proxel BDN, Proxel GXL, Proxel XL-2, and Proxel TN, manufactured by ICI). Examples of dissolution aids or antioxidants include: amines such as diethanolamine, triethanolamine, propanolamine, and morpholine, and modification products thereof; inorganic salts such as potassium hydroxide, sodium hydroxide, and lithium hydroxide; ammonium hydroxide; quaternary ammonium hydroxide such as tetramethylammonium; salts of carbonic acid such as potassium carbonate, sodium carbonate, and lithium carbonate; salts of phosphoric acid such as potassium phosphate, sodium phosphate, and lithium phosphate; N-methyl-2-pyrrolidone; urea compounds such as urea, thiourea, and tetramethylurea; allophanates such as allophanate and methyl allophanate; biurets such as biuret, dimethylbiuret, and tetramethylbiuret; and L-ascorbic acid and salts thereof. Further, for example, urea, thiourea, or ethylene urea may be added to prevent nozzle drying.

I-6. Production of Treatment Liquid

The treatment liquid according to the present invention may be prepared by properly mixing the above ingredients together in any order to dissolve (or disperse) them and if necessary removing impurities and the like by filtration.

In the treatment liquid according to the present invention, the mixing amounts of the above ingredients can be properly determined so as to satisfy requirements, for example, that the water-based ink composition deposited after the deposition of the treatment liquid has high adhesion to the surface of plastic; the heterocyclic ketone compound can be evenly coated onto the surface of plastic; the viscosity and surface tension are such that the treatment liquid can be ejected through an ink jet recording head; the treatment liquid is not coagulated or solidified in a storage container or in nozzles in an ink jet head; and members in contact with liquids in an ink jet printer are not dissolved in or broken by the treatment liquid. For example, the treatment liquid typically has the following composition:

| Heterocyclic ketone compound | 0.1 to 50.0 wt% |
| Surfactant | 0.01 to 5.0 wt% |
| Low-surface tension organic solvent | 0 to 25.0 wt% |
| Water | Balance. |

Accordingly, in one preferred embodiment of the present invention, in the treatment liquid, the content of the heterocyclic ketone compound is 0.1 to 50.0% by weight, and the content of the surfactant is 0.01 to 5.0% by weight.

I-7. Recording Method Using Treatment Liquid

As described above, the method for ink jet recording according to the first aspect of the present invention comprises coating a treatment liquid onto a recording medium having a recording face formed of a plastic film, then ejecting droplets of an ink composition and depositing the droplets onto the recording face to perform printing.

In the step of coating a treatment liquid, the treatment liquid according to the present invention is coated onto a recording medium in its recording face. In this step, preferably, the treatment liquid is previously coated onto at least a part (a printing part) into which the water-based pigment ink is implanted in the next ink jet recording step. The coverage can be properly regulated depending, for example, upon the state of the plastic film as the recording medium and the type of the material of the plastic film, and the implantation amount of ink.

In the present invention, the treatment liquid may be coated by any method without particular limitation, and examples of coating methods include brush coating, or contact-type coating using a conventional coating device such as an air knife coater, a roll coater, a bar coater, a blade coater, a slide hopper coater, a gravure coater, a flexogravure coater, a curtain coater, an extrusion coater, a floating knife coater, a Komma coater, a die coater, gate roll coater, or a size press, and non-contact-type coating using a spray, an ink jet head, a jet nozzle or the like.

In the present invention, preferably, the treatment liquid may be coated by an ink jet recording method in which droplets of the treatment liquid are ejected and deposited onto the recording medium in its recording face. When the ink jet recording method is adopted, the coating position and coating amount of the treatment liquid can be properly controlled. The treatment liquid can be coated only onto the part to be printed by controlling the coating position. Accordingly, the amount of the treatment liquid used can be saved, and, when the treatment liquid is printed on the edge of the plastic recording medium, it is possible to prevent the treatment liquid from running over from the plastic recording medium. When a large amount of solvent is coated onto the plastic recording medium, the whole plastic is dissolved or softened. However, the plastic recording medium only in its very shallow part from the surface of the plastic recording medium can be selectively dissolved by controlling the coating amount.

In a preferred embodiment of the present invention, the ink jet recording method according to the first aspect of the present invention further comprises, before the deposition of the ink composition, a drying step of evaporating water from the coated treatment liquid to evaporate a part of the heterocyclic ketone compound. Evaporation of a part of the heterocyclic ketone compound in the treatment liquid means that the heterocyclic ketone compound is evaporated in the treatment liquid on the coated face so that, when the ink composition is deposited onto the treatment liquid coating face, the treatment liquid coated face is not in a fully dried state and the plastic surface dissolved state is maintained. The amount of the heterocyclic ketone compound necessary for realizing this dissolved state (or the amount of the heterocyclic ketone compound to be evaporated) may be properly varied by regulating drying conditions while taking into consideration the level of adhesion between the film to be formed by the ink composition and the plastic surface.

After coating the treatment liquid, drying for removing water can be carried out by a conventional method using conventional heat drying means, for example, a conventional heating device such as an infrared heating device or a hot air heating device. In the present invention, preferably, drying treatment in the drying step can be carried out by heating with a heater or hot-air drying. In the case of heating with a heater or hot-air drying, the drying can be carried out at 25 to 90° C. (preferably 40 to 70° C.) for 1 to 60 min.

Next, in the ink jet recording method according to the first aspect of the present invention, after coating the treatment liquid, an ink composition is deposited on the coating face. In this case, preferably, ink is deposited by an ink jet recording method. Further, the ink composition referred to herein is a water-based pigment ink composition comprising at least a pigment, a thermoplastic resin, and water which will be described later.

In a preferred embodiment of the present invention, the ink jet recording method according to the first aspect of the present invention further comprises the step of heating the ink composition deposited on the recording face to form a resin film. The heating means can be carried out by a conventional method using a conventional heating device such as an infrared heating device or a hot air heating device. In the present invention, preferably, heating treatment in the heating step can be carried out by heating with a heater or hot-air drying. The heating may be carried out under such conditions that the resin contained in the ink composition is cured by heating to form a resin film, and the heating conditions may be properly determined by taking into consideration, for example, the type of resin particles. For example, in the case of heating with a heater or hot-air drying, the heating can be carried out at 25 to 90° C. (preferably 40 to 70° C.) for one min to one days (preferably 2 min to 16 hr).

I-8. Water-Based Pigment Ink Composition to be Used in Combination with Treatment Liquid The water-based pigment ink composition usable in the first aspect of the present invention comprises at least a pigment, a thermoplastic resin, and water.

I-8-1. Pigment

In the present invention, the water-based pigment ink composition may contain any desired pigment that has hitherto been used in water-based ink compositions for ink jet recording. Examples of pigments include organic pigments or inorganic pigments which have hitherto been used in ink compositions for ink jet recording. The pigment may be added, to the ink composition, as a resin dispersed pigment comprising a pigment which has been dispersed together with a dispersant such as a water soluble resin or a surfactant, or as a surface treatment pigment comprising a pigment which could have been rendered dispersible or dissolvable in a water-based medium without use of any dispersant by introducing a hydrophilic group into the pigment surface. When the pigment is dispersed with the aid of a resin dispersant, a thermoplastic resin, which will be described later, may be used as a thermoplastic resin dispersant. Two or more pigments may be used in combination.

Inorganic pigments usable herein include titanium oxide, iron oxide, and carbon blacks produced by conventional processes such as contact, furnace, and thermal processes.

Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black. Among these pigments, pigments having good affinity for water are preferred.

More specifically, pigments for black ink include, for example, carbon blacks (C.I. Pigment Black 7) such as furnace black, lamp black, acetylene black, or channel black, metal oxides such as copper oxide, iron oxide (C.I. Pigment Black 11), and titanium oxide, and organic pigments such as aniline black (C.I. Pigment Black 1).

Specific examples of suitable carbon blacks include: carbon blacks manufactured by Mitsubishi Chemical Corporation, for example, No. 2300, No. 900, MCF 88, No. 20B, No. 33, No. 40, No. 45, No. 52, MA 7, MA 8, MA 100, and No. 2200 B; carbon blacks manufactured by Degussa, for example, ColorBlack FW1, ColorBlack FW2, ColorBlack FW2V, ColorBlack FW18, ColorBlack FW200, ColorBlack S150, ColorBlack S160 and ColorBlack S170, Pritex 35, Pritex U, Pritex V and Pritex 140U, Special Black 6, Special Black 5, Special Black 4A, Special Black 4 and Special Black 250; carbon blacks manufactured by Columbian Carbon Co., Ltd., for example, CONDUCTEX SC, Raven 1255, Raven 5750, Raven 5250, Raven 5000, Raven 3500, Raven 1255, and Raven 700; and carbon blacks manufactured by Cabot Corporation, for example, Regal 400 R, Regal 330 R, Regal 660 R, Mogul L, Monarch 700, Monarch 800, Monarch 880, Monarch 900, Monarch 1000, Monarch 1100, Monarch 1300, Monarch 1400, and Elftex 12.

Pigments for color inks include C.I. Pigment Yellow 1 (Fast Yellow G), C.I. Pigment Yellow 3, C.I. Pigment Yellow 12 (Disazo Yellow AAA), C.I. Pigment Yellow 13, C.I. Pigment Yellow 14, C.I. Pigment Yellow 17, C.I. Pigment Yellow 23, C.I. Pigment Yellow 24, C.I. Pigment Yellow 34, C.I. Pigment Yellow 35, C.I. Pigment Yellow 37, C.I. Pigment Yellow 42 (yellow iron oxide), C.I. Pigment Yellow 53, C.I. Pigment Yellow 55, C.I. Pigment Yellow 74, C.I. Pigment Yellow 81, C.I. Pigment Yellow 83 (Disazo Yellow HR), C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 108, C.I. Pigment Yellow 109, C.I. Pigment Yellow 110, C.I. Pigment Yellow 117, C.I. Pigment Yellow 120, C.I. Pigment Yellow 138, C.I. Pigment Yellow 153, and C.I. Pigment Yellow 154; C.I. Pigment Red 1, C.I. Pigment Red 2, C.I. Pigment Red 3, C.I. Pigment Red 5, C.I. Pigment Red 17, C.I. Pigment Red 22 (Brilliant Fast Scarlet), C.I. Pigment Red 23, C.I. Pigment Red 31, C.I. Pigment Red 38, C.I. Pigment Red 48:2 (Permanent Red 2B(Ba)), C.I. Pigment Red 48:2 (Permanent Red 2B(Ca)), C.I. Pigment Red 48:3 (Permanent Red 2B(Sr)), C.I. Pigment Red 48:4 (Permanent Red 2B(Mn)), C.I. Pigment Red 49:1, C.I. Pigment Red 52:2, C.I. Pigment Red 53:1, C.I.

Pigment Red 57:1 (Brilliant Carmine 6B), C.I. Pigment Red 60:1, C.I. Pigment Red 63:1, C.I. Pigment Red 63:2, C.I. Pigment Red 64:1, C.I. Pigment Red 81 (Rhodamine 6G Lake), C.I. Pigment Red 83, C.I. Pigment Red 88, C.I. Pigment Red 92, C.I. Pigment Red 101 (red oxide), C.I. Pigment Red 104, C.I. Pigment Red 105, C.I. Pigment Red 106, C.I. Pigment Red 108 (cadmium red), C.I. Pigment Red 112, C.I. Pigment Red 114, C.I. Pigment Red 122 (quinacridone magenta), C.I. Pigment Red 123, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209 and C.I. Pigment Red 219; or C.I. Pigment Blue 1, C.I. Pigment Blue 2, C.I. Pigment Blue 15 (Phthalocyanine Blue R), C.I. Pigment Blue 15:1, C.I. Pigment Blue 15:2, C.I. Pigment Blue 15:3 (Phthalocyanine Blue G), C.I. Pigment Blue 15:4, C.I. Pigment Blue 15:6 (Phthalocyanine Blue E), C.I. Pigment Blue 16, C.I. Pigment Blue 17:1, C.I. Pigment Blue 56, C.I. Pigment Blue 60 and C.I. Pigment Blue 63; and the like.

The particle diameter of the pigment is not particularly limited. Preferably, however, the average particle diameter is not more than 25 μm, more preferably not more than 1 μm. When the pigment has an average particle diameter of not more than 25 μm, the occurrence of clogging can be suppressed and more satisfactory ejection stability can be realized.

The content of the pigment is preferably 0.5 to 25% by weight, more preferably 2 to 15% by weight, based on the whole water-based pigment ink composition.

I-8-2. Thermoplastic Resin

In the first aspect of the present invention, the water-based pigment ink composition comprises a thermoplastic resin.

Resins soluble or insoluble in water-based ink media may be used as the thermoplastic resin. The above resin dispersant used in the dispersion of the pigment is suitable as the resin soluble in the water-based ink medium. Regarding the resin insoluble in the water-based ink medium, preferably, resin particles are added in a resin emulsion form to the ink composition. The resin emulsion comprises water as a continuous phase and a resin component (a thermoplastic resin component) as a dispersed phase.

In a preferred embodiment of the present invention, the thermoplastic resin is a polymer that has a hydrophilic moiety and a hydrophobic moiety in combination. When the resin emulsion is used as the thermoplastic resin, the particle diameter is not particularly limited so far as an emulsion is formed. Preferably, however, the particle diameter is about not more than 150 nm, more preferably about 5 to 100 nm.

The same resin component as in the dispersant resins or resin emulsions, which have hitherto been used in ink compositions for ink jet recording, may be used as the thermoplastic resin. Specific examples of thermoplastic resins usable herein include acrylic polymers, for example; polyacrylic esters or copolymers thereof, polymethacrylic esters or copolymers thereof, polyacrylonitrile or copolymers thereof, polycyanoacrylate, polyacrylamide, polyacrylic acid, or polymethacrylic acid; polyolefin polymers, for example, polyethylene, polypropylene, polybutene, polyisobutylene, polystyrene, or copolymers thereof, petroleum resins, cumarone-indene resins, or terpene resins; vinyl acetate-vinyl alcohol polymers, for example, polyvinyl acetate or copolymers thereof, polyvinyl alcohol, polyvinyl acetal, or polyvinyl ether; halogen-containing polymers, for example, polyvinyl chloride or copolymers thereof, polyvinylidene chloride, fluororesins, or fluororubbers; nitrogen-containing vinyl polymers, for example, polyvinylcarbazole, polyvinylpyrrolidone or copolymers thereof, polyvinylpyridine, or polyvinylimidazole; diene polymers, for example, polybutadiene or copolymers thereof, polychloroprene, or polyisoprene (butyl rubbers); or other ring opening polymerization-type resins, condensation polymerization-type resins, or naturally occurring polymer resins.

When the thermoplastic resin is provided in an emulsion form, the emulsion may be prepared by mixing resin particles, optionally together with a surfactant, into water. For example, an emulsion of an acrylic resin or a styrene-acrylic acid copolymer resin can be prepared by mixing an (meth) acrylic ester resin or a styrene-(meth)acrylic ester resin and optionally an (meth)acrylic acid resin and a surfactant into water. In general, the mixing ratio between the resin component and the surfactant is preferably about 50:1 to 5:1. When the amount of the surfactant used is below the lower limit of the above-defined amount range, emulsion is less likely to be formed. On the other hand, when the amount of the surfactant used is above the upper limit of the above-defined amount range, disadvantageously, there is a tendency that a deterioration in waterfastness of the ink or a deterioration in adhesion occurs.

The surfactant used in the preparation of the resin emulsion is not particularly limited. Preferred surfactants include anionic surfactants, for example, sodium dodecylbenzenesulfonate, sodium laurylate, and ammonium salt of polyoxyethylene alkyl ether sulfate, nonionic surfactants, for example, polyoxyethylene alkyl ether, polyoxyethylene alkyl ester, polyoxyethylene sorbitan fatty acid ester, polyoxyethylene alkyl phenyl ether, polyoxyethylene alkylamine, and polyoxyethylene alkylamide. They may also be used as a mixture of two or more.

The emulsion of the thermoplastic resin may also be produced by emulsion polymerizing the monomer of the above resin component in water in the presence of a polymerization catalyst and an emulsifier. A polymerization initiator, an emulsifier, and a molecular weight modifier used in the emulsion polymerization may be used by a conventional method.

The polymerization initiator may be the same as used in the conventional radical polymerization, and examples thereof include potassium persulfate, ammonium persulfate, hydrogen peroxide, azobisisobutyronitrile, benzoyl peroxide, dibutyl peroxide, peracetic acid, cumene hydroperoxide, t-butyl hydroxyperoxide, and p-menthane hydroxyperoxide. When the polymerization reaction is carried out in water, the use of a water soluble polymerization initiator is preferred. For example, in additon to sodium laurylsulfate, compounds which have been generally used as anionic surfactants, nonionic surfactants or amphoteric surfactants, and mixture of these surfactants, may be mentioned as the emulsifier. A mixture of two or more of them may also be used.

The ratio between the resin as the dispersed phase component and water is preferably 60 to 400 parts by weight, more preferably 100 to 200 parts by weight, of water based on 100 parts by weight of the resin.

When a resin emulsion is used as the thermoplastic resin, a conventional resin emulsion may also be used. For example, resin emulsions described, for example, in Japanese Patent Publication No. 1426/1987, Japanese Patent Laid-Open Publication No. 56573/1991, Japanese Patent Laid-Open Publication No. 79678/1991, Japanese Patent Laid-Open Publication No. 160068/1991 or Japanese Patent Laid-Open Publication No. 18462/1992 as such may be used. Commercially available resin emulsions may also be used. For example, Microgel E-1002 and Microgel E-5002 (styrene-acrylic resin emulsion; manufactured by Nippon Paint Co., Ltd.), Voncoat 4001 (acrylic resin emulsion; manufactured by Dainippon Ink and Chemicals, Inc.), Voncoat 5454 (styrene-acrylic resin emulsion; manufactured by Dainippon Ink and Chemicals, Inc.), SAE1014 (styrene-acrylic resin emulsion; manufactured by Zeon Corporation), or Saivinol SK-200 (acrylic resin emulsion; manufactured by Saiden Chemical Industry Co., Ltd.).

In the present invention, the thermoplastic resin may be mixed as a fine particle powder with other ingredients in the water-based pigment ink composition. A method, however, is more preferably adopted in which resin fine particles are dispersed in a water medium to prepare a resin emulsion which is then mixed with other ingredients in the ink composition. When the thermoplastic resin is used as a dispersant for the pigment, mixing the thermoplastic resin in a pigment dispersion liquid form with other ingredients in the ink composition is preferred.

The thermoplastic resin is preferably contained in an amount of 0.1 to 30% by weight, more preferably 0.3 to 15% by weight, in terms of solid content based on the total amount of the water-based pigment ink composition.

I-8-3. Water and Other Ingredients

The water-based pigment ink composition comprises water. The water may be selected according to the description in the column of "I-4 Main solvent" in connection with the treatment liquid. Further, other ingredients in the water-based pigment ink composition may be properly selected from conventional other ingredients such as penetrating agents and humectants and according to the description, for example, the columns of "I-2. Surfactant", "I-3. Low-surface tension organic solvent", "I-5. Other ingredients," and "Wetting agent" which will be described later.

The water-based pigment ink composition according to the present invention may be prepared by properly mixing the above ingredients individually or through the form of a pigment dispersion liquid or a resin emulsion in any desired sequence for dissolution (or dispersion) and then if necessary removing impurities and the like by filtration.

II. Primer Liquid for Printing

According to the second aspect of the present invention, there is provided a primer liquid for printing for an ink jet recording medium having a recording face formed of a plastic film.

As described above, the primer liquid for printing according to the present invention is used for printing on an ink jet recording medium having a recording face formed of a plastic film. The primer liquid comprises at least a heterocyclic ketone compound selected from the group consisting of cyclic ester compounds of formula (1), cyclic amide compound of formula (2), and a combination thereof, a thermoplastic resin, and a main solvent, the thermoplastic resin being dispersed in the primer liquid. In other words, the primer liquid according to the present invention comprises a dispersing medium comprising at least the heterocyclic ketone compound and the main solvent and the thermoplastic resin dispersed in the dispersing medium. As described below, the main solvent is preferably water. Preferably, the primer liquid according to the present invention further comprises a surfactant and/or a low-surface tension organic solvent. More preferably, the primer liquid according to the present invention further comprises a surfactant or further comprises a surfactant and a low-surface tension organic solvent. The primer liquid according to the present invention may further comprise a wetting agent which will be described later. Preferably, the primer liquid according to the present invention is coated onto the recording medium by an ink jet recording method.

The primer liquid according to the present invention is used for printing on recording media having a recording face formed of a plastic film. The primer liquid according to the present invention can be used for printing on non-surface treated plastic films for ink jet printing, as well as surface-treated plastic films for ink jet printing.

The primer liquid according to the present invention is preferably used with the ink composition comprising the thermoplastic resin. In this case, the surface of the plastic film is strongly adhered to a resin film, formed by drying of the ink, through a primer film formed from the primer liquid. As a result, a plastic recorded matter possessing excellent rubbing resistance, scratch resistance, and waterfastness can be formed. In this case, the ink composition is preferably a water-based pigment ink composition comprising at least a pigment, a thermoplastic resin, and water. Therefore, in the present invention, since a pigment-type water-based ink composition can be used, recorded matters possessing excellent lightfastness can be formed on plastic films.

The primer film refers to such a state that water in the primer liquid has been completely or partially evaporated to cure the thermoplastic resin contained in the primer liquid and consequently to bring the whole primer liquid to a unified film.

The reason for which the desired effect can be attained by the present invention is considered as follows. However, the following reason is hypothetical and should not be construed as limiting the present invention.

Upon coating onto a plastic film, the primer liquid according to the present invention is spread evenly on the surface of the plastic film. When water is evaporated in this state, the heterocyclic ketone compound can be allowed to stay homogeneously in a high concentration on the surface of the plastic film. Consequently, it is considered that the heterocyclic ketone compound can bring a very shallow part from the surface of the plastic film to a dissolved or wetted state. At the same time, the resin component contained in the primer liquid is cured to allow the formation of a film to proceed and thus to form a primer film. In this case, the primer film together with dissolved plastic is considered to form a mixed layer. Accordingly, the plastic film surface is integrated with the resin film to provide a primer film strongly adhered to the plastic film surface. An ink composition containing a resin, which can be brought to a film state upon heating, is deposited thereon, and the resin contained in the ink composition is then cured to form a film, whereby the cured film of this ink is bonded strongly to the primer film. In this case, when the composition of the resin contained in the primer liquid is the same as the composition of the resin contained in the ink composition, the cured film of this ink is bonded more strongly to the primer film than the case where the composition of the resin contained in the primer liquid is different from the composition of the resin contained in the ink composition. The use of the primer liquid is considered to significantly improve the adhesion between the ink layer and the plastic film through the primer film. The enhanced adhesion can substantially prevent the separation of the print caused, for example, by external force such as friction or the entry of water into the interface and thus can realize the formation of plastic recorded matters possessing excellent rubbing resistance, scratch resistance and water resistance. Thus, the preparation of strong printed matters utilizing the durability of the plastic film per se can be realized.

In the primer liquid according to the present invention, preferably, since the heterocyclic ketone compound, which is a component capable of dissolving the plastic, has been diluted with water, there is substantially no possibility that the primer liquid breaks or damages members constituting the printer with which the liquid comes into contact. Further, since a preferred primer liquid according to the present invention is in an aqueous solution form, the primer liquid per se and vapor generated from the primer liquid are also highly safe.

II-1. Heterocyclic Ketone Compound

The primer liquid for printing according to the present invention comprises a heterocyclic ketone compound as an indispensable component. As described above, the heterocyclic ketone compound is a heterocyclic ketone compound selected from the group consisting of cyclic ester compounds of formula (1), cyclic amide compounds of formula (2), and a combination thereof, preferably either a cyclic ester compound of formula (1) or a cyclic amide compound of formula (2).

Specifically, the heterocyclic ketone compound may be selected according to the description in the column of "I-1. Heterocyclic ketone compound" in the treatment liquid.

When the content of the cyclic ester compound in the primer liquid according to the present invention is excessively small in relation to the whole primer liquid composition, the dissolution of the plastic surface is unsatisfactory and, consequently, the primer film is sometimes not adhered to the plastic. On the other hand, when the content of the cyclic ester compound is excessively large in relation to the whole primer liquid composition, the dispersion stability of the resin component is sometimes deteriorated. In view of the above, the content of the cyclic ester compound in the primer liquid according to the present invention is preferably selected so that the primer liquid can be coated evenly onto the recording medium, has a predetermined surface tension, and does not substantially break or damage members, constituting a printer, in contact with the liquid. For example, the content of the cyclic ester compound is 0.1 to 40.0% by weight, preferably 2.0 to 25.0% by weight, based on the total amount of the primer liquid.

In a preferred embodiment of the present invention, in the primer liquid for printing, at least two cyclic amide compounds of formula (2) are used. When two or more cyclic amide compounds are used, the separation or crystallization of the cyclic amide compound in the course of the evaporation of the solvent from the primer liquid can be prevented. Further, the use of two or more cyclic amide compounds of formula (2) can enhance the solubility of the cyclic amide compounds in the primer liquid solvent and thus can prevent such an unfavorable phenomenon that the cyclic amide compounds are present unevenly on the plastic surface and, consequently, the plastic dissolution capability varies from part to part.

The content of the cyclic amide compound in the primer liquid according to the present invention is not particularly limited so far as the concentration and surface tension of the primer liquid are suitable for coating of the primer liquid evenly onto the recording medium by ink jet recording and the primer liquid does not substantially break or damage members, constituting the printer, in contact with the liquid. The content of the cyclic amide compound may be, for example, 0.1 to 40.0% by weight, preferably 2.0 to 25.0% by weight, based on the total amount of the primer liquid. When two or more cyclic amide compounds are used, the content of the cyclic amide compound refers to the total content of the two or more cyclic amide compounds.

In the primer liquid for printing, the content of the heterocyclic ketone compound is, for example, 0.1 to 40.0% by weight, preferably 2.0 to 25.0% by weight, based on the total amount of the primer liquid.

II-2. Thermoplastic Resin

The primer liquid according to the present invention comprises a thermoplastic resin. Resins soluble or insoluble in the main solvent in the primer liquid may be used as the thermoplastic resin. The above resin dispersant used in the dispersion of the pigment is suitable as the resin soluble in the main solvent in the primer liquid. Regarding the resin insoluble in the main solvent in the primer liquid, preferably, resin particles are added in a resin emulsion form to the primer liquid. The resin emulsion comprises a main solvent as a continuous phase and a resin component (a thermoplastic resin component) as a dispersed phase.

The thermoplastic resin used in the primer liquid according to the present invention may be specifically selected according to the description in the column of "I-8-2. Thermoplastic resin" in connection with the treatment liquid.

In the present invention, the thermoplastic resin may be mixed as a fine particle powder with other ingredients in the primer liquid. However, a method is preferably adopted in which the resin fine particles are dispersed in a water medium to prepare a resin emulsion which is then mixed with other ingredients in the primer liquid.

From the viewpoints of the long-term storage stability and ejection stability of the primer liquid, the particle diameter of the resin fine particles preferred in the present invention is preferably in the range of 5 to 400 nm, more preferably in the range of 50 to 200 nm.

The content of the thermoplastic resin is preferably 0.1 to 15.0% by weight, more preferably 1.0 to 10.0% by weight, in terms of solid content based on the total amount of the primer liquid. In the primer liquid, when the content of the resin component is below the lower limit of the above defined content range, the primer film formed on the plastic surface is thin and, consequently, the adhesion between the primer film and the ink layer is sometimes unsatisfactory. On the other hand, when the content of the resin component is above the upper limit of the above defined content range, in some cases, the dispersion of the resin becomes unstable during the storage of the primer liquid, or even upon the evaporation of a very small amount of water, the resin component is coagulated and solidified, making it impossible to form an even primer film.

In a preferred embodiment of the present invention, the composition of the thermoplastic resin in the primer liquid component is the same as the composition of the thermoplastic resin used in the water-based pigment ink composition used in combination with the primer liquid ("II-10. Water-based pigment ink composition used in combination with primer liquid"). When the thermoplastic resin in the primer liquid component has the same composition as the thermoplastic resin used in the water-based pigment ink composition, the affinity of the primer film for the resin film formed from the ink composition is enhanced and, consequently, the adhesion between the primer film and the resin film can be further enhanced.

II-3. Surfactant

The aqueous solution is usually repelled by plastics. Since, however, a surfactant and/or a low-surface tension organic solvent can be added to the primer liquid according to the present invention, the heterocyclic ketone compound can be coated evenly on the plastic surface. It is considered that, upon the evaporation of water from the evenly coated primer liquid, the heterocyclic ketone compound is fixed adequately on the surface of the plastic and can dissolve the plastic surface only in its desired area. Further, when the primer liquid is evenly coated, the resin contained in the primer liquid can also be brought to an even film on the plastic film surface.

The surfactant used in the primer liquid according to the present invention may be specifically selected according to the description in the column of "I-2. Surfactant" in connection with the treatment liquid.

The content of the surfactant in the primer liquid according to the present invention is not particularly limited so far as the heterocyclic ketone compound can be coated evenly on the plastic surface, and the surfactant content may be properly selected depending upon the type of the surfactant used and the type and amount of the heterocyclic ketone compound used. The content of the surfactant may be, for example, 0.01 to 5.0% by weight, preferably 0.1 to 2.0% by weight, based on the total amount of the primer liquid.

II-4. Low-Surface Tension Organic Solvent

In order to coat the heterocyclic ketone compound evenly on the plastic surface, the primer liquid according to the present invention may contain a low-surface tension organic solvent instead of or in addition to the surfactant.

The low-surface tension organic solvent used in the primer liquid according to the present invention may be specifically selected according to the description in the column of "I-3. Low-surface tension organic solvent" in connection with the treatment liquid.

The content of the low-surface tension organic solvent in the primer liquid according to the present invention is not particularly limited, so far as the heterocyclic ketone compound can be evenly coated onto the surface of plastic, and may be properly selected according to the kind and amount of the heterocyclic ketone compound and the surfactant used. The content of the low-surface tension organic solvent may be, for example, 0 to 25.0% by weight, preferably 2.0 to 15.0% by weight, based on the total amount of the primer liquid.

Various properties of the primer liquid according to the present invention can be properly regulated. In a preferred embodiment of the present invention, the viscosity of the primer liquid is preferably not more than 25 mPa·sec, more preferably not more than 10 mPa·sec (25° C.). When the viscosity is in this range, the primer liquid can be stably ejected through an ink ejection head. Further, the surface tension of the primer liquid according to the present invention can be properly regulated and is preferably approximately in the range of 20.0 to 40.0 mN/m (25° C.), more preferably approximately in the range of 25.0 to 35.0 mN/m.

II-5. Wetting Agent

From the viewpoint of easiness on storage of the primer liquid and good handleability of the primer liquid in the coating, a conventional wetting agent (a water soluble organic solvent) may be further added to the primer liquid according to the present invention. The incorporation of the wetting agent can prevent coagulation and solidification of the resin component caused by the evaporation of water. Consequently, in ink jet coating, clogging of the ink jet head nozzle can be prevented, and ejection stability can be ensured.

For example, water soluble polyhydric alcohols, particularly di- to pentahydric alcohols having 2 to 10 carbon atoms, nitrogen-containing hydrocarbon solvents, for example, formamides, imidazolidinones, pyrrolidones, or amines, and sulfur-containing hydrocarbons may be used as the wetting agent. They may used in a combination of two or more.

The water soluble polyhydric alcohol may be, for example, one of or a combination of two or more of di- or trihydric alcohols having 3 to 10 carbon atoms, for example, glycerin, ethylene glycol, diethylene glycol, triethylene glycol, dipropylene glycol, hexylene glycol, and 1,2,6-hexanetriol.

The content of the wetting agent may be, for example, 0 to 5.0% by weight, preferably 1.0 to 5.0% by weight, based on the total amount of the primer liquid. When the wetting agent content is in the above defined range, clogging preventive properties and ejection stability can be ensured. When the wetting agent content is above the upper limit of the above defined range, drying is sometimes unsatisfactory.

II-6. Main Solvent

The primer liquid according to the present invention contains a main solvent. In order to coat a heterocyclic ketone compound-containing water-soluble component thinly and evenly on the surface of plastic, in the present invention, the heterocyclic ketone compound is diluted with a main solvent before coating. For example, water or a water-soluble organic solvent is usable as the main solvent. In the present invention, water is preferred, for example, from the viewpoint of safety.

Accordingly, in the primer liquid according to the present invention, the main solvent is preferably water. Water may be pure water obtained by ion exchange, ultrafiltration, reverse osmosis, distillation or the like, or ultrapure water from the viewpoint of minimizing ionic impurities. Water, which has been sterilized, for example, by ultraviolet irradiation or by addition of hydrogen peroxide, is suitable, because this treatment can prevent the growth of mold or bacteria and, thus, the primer liquid can be stored for a long period of time.

II-7. Other Ingredients

When the primer liquid according to the present invention contains the above ingredients, a desired effect can be attained. If necessary, the primer liquid may further comprise preservatives or fungicides, pH adjustors, dissolution aids, antioxidants, nozzle clogging preventive agents and the like.

These other ingredients used in the primer liquid according to the present invention may be specifically selected according to the description in the column of "I-5. Other ingredients" in connection with the treatment liquid.

II-8. Production of Primer Liquid

The primer liquid according to the present invention may be prepared by properly mixing the above ingredients together in any order to dissolve (or disperse) them and if necessary removing impurities and the like by filtration.

In the primer liquid according to the present invention, the mixing amounts of the above ingredients can be properly determined so as to satisfy requirements, for example, that the heterocyclic ketone compound can be evenly coated onto the surface of plastic; the viscosity and surface tension are such that the primer liquid can be ejected through an ink jet recording head; the primer liquid is not coagulated or solidified in a storage container or in nozzles in an ink jet head; and members in contact with liquids in an ink jet printer are not dissolved in or broken by the primer liquid. For example, the primer liquid typically has the following composition:

| | |
|---|---|
| Heterocyclic ketone compound | 0.1 to 40.0 wt% |
| Thermoplastic resin | 0.1 to 15.0 wt% (solid basis) |
| Surfactant | 0.01 to 5.0 wt% |
| Low-surface tension organic solvent | 0 to 25.0 wt% |
| Wetting agent | 0 to 5.0 wt% |
| Water | Balance. |

Accordingly, in one preferred embodiment of the present invention, in the primer liquid, the content of the heterocyclic ketone compound is 0.1 to 40.0% by weight, the content of the thermoplastic resin is 0.1 to 15.0% by weight in terms of solid content, and the content of the surfactant is 0.01 to 5.0% by weight.

II-9. Recording Method Using Primer Liquid for Printing

As described above, the method for ink jet recording according to the second aspect of the present invention comprises coating a primer liquid for printing onto a recording medium having a recording face formed of a plastic film to form a primer film, then ejecting droplets of an ink composition and depositing the droplets onto the recording face to perform printing.

In the step of coating a primer liquid, the primer liquid according to the present invention is coated onto a recording medium in its recording face. In this step, preferably, the primer liquid is previously coated onto at least a part (a printing part) into which the ink is implanted in the next ink jet recording step. The coverage can be properly regulated depending, for example, upon the state of the plastic film as the recording medium and the type of the material of the plastic film, and the implantation amount of ink.

In the present invention, the primer liquid may be coated by any method without particular limitation, and examples of coating methods include brush coating, or contact-type coating using a conventional coating device such as an air knife coater, a roll coater, a bar coater, a blade coater, a slide hopper coater, a gravure coater, a flexogravure coater, a curtain coater, an extrusion coater, a floating knife coater, a Komma coater, a die coater, gate roll coater, or a size press, and non-contact-type coating using a spray, an ink jet head, a jet nozzle or the like.

In the present invention, preferably, the primer liquid may be coated by an ink jet recording method in which droplets of the primer liquid are ejected and deposited onto the recording medium in its recording face. When the ink jet recording method is adopted, the coating position and coating amount of the primer liquid can be properly controlled. The primer liquid can be coated only onto the part to be printed by controlling the coating position. Accordingly, the amount of the primer liquid used can be saved, and, when the primer liquid is printed on the edge of the plastic recording medium, it is possible to prevent the primer liquid from running over from the plastic recording medium. When a large amount of solvent is coated onto the plastic recording medium, the whole plastic is dissolved or softened. However, the plastic recording medium only in its very shallow part from the surface of the plastic recording medium can be selectively dissolved by controlling the coating amount.

In a preferred embodiment of the present invention, the method for ink jet recording according to the second aspect of the present invention further comprises, before the deposition of the ink composition, a drying step of evaporating water in the coated primer liquid to form a primer film. After coating onto the recording medium, preferably, the water in the primer liquid is almost or completely evaporated. Since the heterocyclic ketone compound contained in the primer liquid can also be evaporated by this drying operation, it is considered that the adhesion between the plastic recording medium and the formed primer film can also be enhanced.

After coating the primer liquid, drying for removing water can be carried out by a conventional method using conventional heat drying means, for example, a conventional heating device such as an infrared heating device or a hot air heating device. In the present invention, preferably, drying treatment in the drying step can be carried out by heating with a heater or hot-air drying. Conditions for drying may be properly varied depending, for example, upon the composition and coverage of the primer liquid used. For example, in the case of heating with a heater or hot-air drying, the drying can be carried out at 25 to 90° C. (preferably 40 to 70° C.) for one min to one day.

Next, in the ink jet recording method according to the second aspect of the present invention, after coating the primer liquid, an ink composition is deposited on the coating face. In this case, preferably, ink is deposited by an ink jet recording method. Further, the ink composition referred to herein is a water-based pigment ink composition comprising at least a pigment, a thermoplastic resin, and water which will be described later ("II-10. Water-based pigment ink composition used in combination with primer liquid").

In a preferred embodiment of the present invention, the ink jet recording method according to the second aspect of the present invention further comprises the step of heating the ink composition deposited on the recording face to form a resin film. The heating means can be carried out by a conventional method using conventional heating means, for example, a conventional heating device such as an infrared heating device or a hot air heating device. In the present invention, preferably, heating treatment in the heating step can be carried out by heating with a heater or hot-air drying. Conditions for heating is not limited so far as the resin contained in the ink composition is cured by heating to form a resin film, and the heating conditions may be properly determined by taking into consideration, for example, the type of resin particles. For example, in the case of heating with a heater or hot-air drying, the heating can be carried out at 25 to 90° C. (preferably 40 to 70° C.) for one min to one day (preferably 2 min to 16 hr).

II-10. Water-Based Pigment Ink Composition to be Used in Combination with Primer Liquid The ink composition usable in the second aspect of the present invention is preferably a water-based pigment ink composition comprising at least a pigment, a thermoplastic resin, and water.

This water-based pigment ink composition may be the same as the water-based pigment ink composition according to the first aspect of the present invention and may be properly selected and obtained according to the description in the above column of "I-8. Water-based pigment ink composition to be used in combination with treatment liquid."

III. Ink Composition

According to the third aspect of the present invention, there is provided an ink composition for an ink jet recording medium having a recording face formed of a plastic film.

As described above, the ink composition according to the present invention comprises a heterocyclic ketone compound selected from the group consisting of cyclic ester compounds of formula (1), cyclic amide compounds of formula (2), and a combination thereof, a thermoplastic resin, a colorant, and a main solvent, and the thermoplastic resin is dispersed in said ink composition. In other words, preferably, the ink composition according to the present invention comprises a dispersion medium, comprising at least a heterocyclic ketone compound and a main solvent, and a thermoplastic resin dispersed in this dispersion medium (when the thermoplastic resin functions also as a dispersant for the pigment, the thermoplastic resin together with the pigment is dispersed in the dispersion medium). Preferably, the ink composition according to the present invention further comprises a cyclic ether compound of formula (3). The colorant in the ink composition is preferably a pigment. In this case, the pigment is in the state of being dispersed in the ink composition. The main solvent is preferably water, as described below. Further, preferably, the ink composition according to the present invention further comprises a surfactant and/or a low-surface tension organic solvent. More preferably, the ink composition according to the present invention further comprises a surfactant or further comprises a surfactant and a low-surface tension organic solvent. The ink composition according to the present invention may further comprise a wetting agent The ink composition according to the present invention is used with ink jet recording media of which the recording face is formed of a plastic film. Specifically, the ink composition according to the present invention is suitable for printing onto ink jet recording media of which the recording face is formed of a plastic film. More preferably, the ink composition according to the present invention is coated onto recording media by ink jet recording.

The ink composition according to the present invention can also be used for printing onto all of plastic films for ink jet printing, not subjected to surface treatment, and plastic films for ink jet printing, subjected to surface treatment.

When the ink composition according to the present invention is coated onto recording medium having a recording face formed of a plastic film, a plastic recorded matter having good adhesion to the plastic film and excellent waterfastness can be formed. The reason why the recorded matter having excellent properties can be formed is as follows. However, it should be noted that the following explanation is hypothetical and should not be construed as limiting the scope of the present invention.

The ink composition according to the present invention comprises a solvent, which can dissolve plastic constituting the recording face of the recording medium, and a resin which can be cured to form a film. Accordingly, upon the deposition of the ink composition onto the plastic film, the solvent dissolves the surface of the plastic film, and, at the same time, upon water evaporation, the resin component in the ink composition is cured to form a film and thus to form an ink resin layer. Further, the plastic film surface can be strongly bonded to the resin film formed as a result of drying of the ink. Thus, it is considered that a plastic recorded matter having excellent adhesion to plastic films and excellent waterfastness can be formed.

A more detailed explanation will be given. When the ink composition according to the present invention is coated onto the surface of a plastic film as a recording medium, the surface of the plastic film is brought to a dissolved state due to the action of the solvent, capable of dissolving plastic, contained in the ink composition. In this case, when the content of the solvent capable of dissolving the plastic based on the whole ink is excessively small, the dissolution of the plastic surface is unsatisfactory and, consequently, in some cases, the resin film formed by drying of the ink is not adhered to the plastic surface. On the other hand, when the content of the solvent capable of dissolving the plastic is excessively large, in some cases, the whole plastic is disadvantageously dissolved or softened by the solvent. For this reason, in the present invention, preferably, a heterocyclic ketone compound having lower volatility and a cyclic ether compound having higher volatility are used as the solvent capable of dissolving the plastic. When these two compounds are used in combination, immediately after printing of the ink, due to both the compounds contained in the ink, the concentration of the whole solvent capable of dissolving the plastic is high enough to dissolve the surface layer part on the surface of the plastic. Accordingly, the surface layer part of the plastic, which is less likely to be dissolved as compared with the inside of the plastic, can be dissolved. Thereafter, simultaneously with the evaporation of water in the ink, the highly volatile cyclic ether compound is also evaporated. On the other hand, in the ink in a semi-dried state, the heterocyclic ketone compound having lower volatility stays in the ink and continues to dissolve the surface of the plastic. Thus, in dissolving the plastic film, at the time when the surface layer part is initially dissolved, the concentration of the solvent can be increased to a level that is high enough to dissolve the surface layer part. After the dissolution of the surface layer part, the cyclic ether compound having higher volatility is evaporated. Accordingly, the concentration of the solvent can be reduced to a level that is suitable for dissolving the plastic part within the surface layer in the plastic. According to this technique, it is possible to prevent an increase in the concentration of the solvent capable of dissolving the plastic in its surface to an unnecessarily high level. Therefore, excessive dissolution of the plastic can be prevented, and the dissolved state can be limited only to a very shallow part in the surface of the plastic.

While the very shallow part in the plastic surface is dissolved, upon the evaporation of water in the ink composition on the plastic, the thermoplastic resin contained in the ink composition forms a resin film. In this case, when the plastic surface is in a properly dissolved state, the resin to be brought to a film together with the plastic surface can form a mixed layer. Further, as drying of the ink composition proceeds, the solvent capable of dissolving the plastic is completely evaporated and, further, the ink composition can be fully brought to a film state. The recorded matter thus formed is considered to have a structure of "(plastic film surface)/(mixed layer composed of plastic and ink resin)/(resin layer of ink composition)." In the mixed layer, the plastic is integral with the film formed as a result of curing of the resin contained in the ink. Accordingly, it is considered that the adhesion between the plastic film and the ink composition film is more significantly improved than the case where the ink resin layer is in direct contact with the plastic layer. The enhanced adhesion can substantially prevent the separation of the print caused, for example, by external force such as friction or the entry of water into the interface and thus can realize the formation of plastic recorded matters possessing excellent rubbing/scratch resistance, and water resistance. Thus, the preparation of strong printed matters utilizing the durability of the plastic film per se can be realized.

In the ink composition according to the present invention, preferably, since the heterocyclic ketone compound, which is a component capable of dissolving the plastic, and preferably further the cyclic ether compound have been diluted with water, there is substantially no possibility that the ink composition breaks or damages members constituting the printer with which the liquid comes into contact. Further, since the ink composition according to the present invention is typically in an aqueous solution form, the ink composition per se and vapor generated from the ink composition are also highly safe. Furthermore, since the ink composition according to the present invention may be a pigment-type water-based ink composition using a pigment as a colorant, recorded matter having excellent lightfastness can be formed on plastic films.

III-1. Heterocyclic Ketone Compound

The ink composition for printing according to the present invention comprises a heterocyclic ketone compound as an indispensable component. As described above, the heterocyclic ketone compound is a heterocyclic ketone compound selected from the group consisting of cyclic ester compounds of formula (1), cyclic amide compounds of formula (2), and a combination thereof, preferably either a cyclic ester compound of formula (1) or a cyclic amide compound of formula (2).

Specifically, the heterocyclic ketone compound may be selected according to the description in the column of "I-1. Heterocyclic ketone compound" in the treatment, liquid.

When the content of the cyclic ester compound in the ink composition according to the present invention is excessively small in relation to the whole ink composition, the dissolution of the plastic surface is unsatisfactory and, consequently, the film derived from the ink composition is not sometimes adhered to the plastic. On the other hand, when the content of the cyclic ester compound is excessively large in relation to the whole ink composition, the dispersion stability of the resin component in the ink is sometimes deteriorated. In view of the above, the content of the cyclic ester compound in the ink composition according to the present invention is preferably selected so that the ink composition can be coated evenly onto the recording medium, has a predetermined surface tension, and does not substantially break or damage members, constituting a printer, in contact with the liquid. Further, the amount of the cyclic ether compound used in combination with the heterocyclic ketone compound should also be taken into consideration. For example, the content of the cyclic ester compound is 0.1 to 10.0% by weight, preferably 1.0 to 8.0% by weight, based on the total amount of the ink composition.

In a preferred embodiment of the present invention, in the ink composition, at least two cyclic amide compounds of formula (2) are used. When two or more cyclic amide compounds are used, the separation or crystallization of the cyclic amide compound in the course of the evaporation of the solvent from the ink composition can be prevented. Further, the use of two or more cyclic amide compounds of formula (2) can enhance the solubility of the cyclic amide compounds in the ink composition solvent and thus can prevent such an unfavorable phenomenon that the cyclic amide compounds are present unevenly on the plastic surface and, consequently, the plastic dissolution capability varies from part to part.

When the content of the cyclic amide compound in the ink composition according to the present invention is excessively small in relation to the whole ink composition, the dissolution of the plastic surface is unsatisfactory and, consequently, the film derived from the ink composition is not sometimes adhered to the plastic. On the other hand, when the content of the cyclic amide compound is excessively large in relation to the whole ink composition, the dispersion stability of the resin component in the ink is sometimes deteriorated. In view of the above, the content of the cyclic amide compound in the ink composition according to the present invention is preferably selected so that the ink composition can be coated evenly onto the recording medium, has a predetermined surface tension, and does not substantially break or damage members, constituting a printer, in contact with the liquid. Further, the amount of the cyclic ether compound used in combination with the heterocyclic ketone compound should also be taken into consideration. For example, the content of the cyclic amide compound is 0.1 to 20.0% by weight, preferably 1.0 to 10.0% by weight, based on the total amount of the ink composition. When two or more cyclic amide compounds are used, the content refers to the total content of the two or more compounds.

Accordingly, in the ink composition, the content of the heterocyclic ketone compound is, for example, 0.1 to 10.0% by weight, preferably 0.1 to 20.0% by weight, more preferably 1.0 to 10.0% by weight, still more preferably 1.0 to 8.0% by weight, based on the total amount of the ink composition.

III-2. Cyclic Ether Compound

Preferably, the ink composition according to the present invention further comprises a cyclic ether compound of formula (3).

In formula (3), as described above, R' represents a straight chain or branched chain C2 to C12 saturated hydrocarbon chain, or a straight chain or branched chain C2 to C12 saturated ether chain. Here, for example, "C2 to C12" in "C2 to C12 saturated hydrocarbon chain" means that the number of carbon atoms in the saturated hydrocarbon chain is 2 to 12. This is true of a saturated ether chain.

When R' represents a saturated hydrocarbon chain, the number of carbon atoms is preferably C2 to C8, more preferably C2 to 6, still more preferably C2 to C5, still more preferably C3 to C5. The definition of the straight or branched saturated hydrocarbon chain is the same as the definition in the above heterocyclic ketone compound. Specific examples of saturated hydrocarbon chains in R' include straight C4 saturated hydrocarbon chains.

The straight chain or branched chain C2 to C12 saturated ether chain refers to a chain comprising at least one ether bond inserted into any carbon-carbon bond in the above straight chain or branched chain C2 to C12 saturated hydrocarbon chain. Preferably, only one ether bond is contained in the saturated ether chain. For example, the straight saturated ether chain is preferably represented by —$(CH_2)_q$—O—$(CH_2)_r$— wherein q+r is an integer of 2 to 12. The straight or branched saturated ether chain may if necessary be further substituted, for example, by a hydroxyl group or hydroxymethylene.

Specific examples of cyclic ether compounds include oxirane, oxacyclobutane (oxetane), tetrahydrofuran (oxolane), 3-methyl-oxolane, oxane, 1,3-dioxolane, 1,3-dioxane, 1,4-dioxane, 2-methyltetrahydrofuran, and 1,3,5-trioxane. The cyclic ether compound is preferably selected from the group consisting of tetrahydrofuran, 1,4-dioxane, and 2-methyltetrahydrofuran. More preferred are tetrahydrofuran and 1,4-dioxane.

These cyclic ether compounds may be used as a mixture of two or more.

The cyclic ether compound used in the present invention may if necessary be synthesized or alternatively may be a commercially available product.

When the content of the cyclic ether compound based on the whole ink composition is excessively low, the dissolution of the plastic surface is unsatisfactory. In this case, the film formed from the ink composition is not sometimes adhered to the plastic. On the other hand, when the content of the cyclic ether compound is excessively high, the dispersion stability of the resin component in the ink is sometimes deteriorated. Accordingly, while taking the above points into consideration, the content of the cyclic ether compound is preferably selected so that members, constituting a printer, in contact with the liquid are hardly broken or damaged. In determining the content of the cyclic ether compound, preferably the amount of the heterocyclic ketone compound used in combination with the cyclic ether compound is also taken into consideration. The content of the cyclic ether compound is, for example, 0.1 to 10.0% by weight, preferably 0.5 to 5.0% by weight, based on the total amount of the ink composition.

In a preferred embodiment of the present invention, preferred combinations of cyclic ester compound with cyclic ether compounds include:

a combination of γ-butyrolactone with tetrahydrofuran;

a combination of γ-butyrolactone with 1,4-dioxane;

a combination of γ-butyrolactone with 2-methyltetrahydrofuran;

a combination of propylene carbonate with tetrahydrofuran;

a combination of propylene carbonate with 1,4-dioxane; and a combination of propylene carbonate with 2-methyltetrahydrofuran.

In a preferred embodiment of the present invention, preferred combinations of cyclic amide compounds with cyclic ether compounds include:

a combination of 2-pyrrolidone with ε-caprolactam and tetrahydrofuran;

a combination of 2-pyrrolidone with ε-caprolactam and 1,4-dioxane;

a combination of 2-pyrrolidone with ε-caprolactam and 2-methyltetrahydrofuran;

a combination of N-methyl-2-pyrrolidone with ε-caprolactam and tetrahydrofuran;

a combination of N-methyl-2-pyrrolidone with ε-caprolactam and 1,4-dioxane; and a combination of N-methyl-2-pyrrolidone with ε-caprolactam and 2-methyltetrahydrofuran.

III-3. Thermoplastic Resin

The ink composition according to the present invention comprises a thermoplastic resin. The thermoplastic resin is in the state of being dispersed in the ink composition. The thermoplastic resin may be soluble or insoluble in the water-based ink medium. The above-described resin dispersant used in the dispersion of the pigment is suitable as the resin soluble in the water-based ink medium. Regarding the resin insoluble in the water-based ink medium, preferably, resin particles are added in the form of a resin emulsion to the ink composition The resin emulsion comprises water as a continuous phase and a resin component (a thermoplastic resin component) as a dispersed phase.

The thermoplastic resin used in the ink composition according to the present invention may be specifically selected according to the description in the column of "I-8-2. Thermoplastic resin" in connection with the treatment liquid.

In the present invention, the thermoplastic resin may be mixed as a fine particle powder with other ingredients in the ink composition. However, a method is preferably adopted in which the resin fine particles are dispersed in a water medium to prepare a resin emulsion which is then mixed with other ingredients in the ink composition.

From the viewpoints of the long-term storage stability and ejection stability of the ink composition, the particle diameter of the resin fine particles preferred in the present invention is preferably in the range of 5 to 400 nm, more preferably in the range of 50 to 200 nm.

The content of the thermoplastic resin is preferably 0.1 to 15.0% by weight, more preferably 0.5 to 10.0% by weight, in terms of solid content based on the total amount of the ink composition. In the ink composition, when the content of the resin component is below the lower limit of the above defined content range, the ink film formed on the plastic surface is thin and, consequently, the adhesion between the ink composition and the plastic surface is sometimes unsatisfactory. On the other hand, when the content of the resin component is above the upper limit of the above defined content range, in some cases, the dispersion of the resin becomes unstable during the storage of the ink composition, or even upon the evaporation of a very small amount of water, the resin component is coagulated and solidified, making it impossible to form an even film.

III-4. Colorant

The ink composition according to the present invention comprises a colorant. Colorants usable herein include dyes or pigments. In the present invention, the colorant is preferably a pigment.

The type of the dye is not particularly limited, and acid dyes, direct dyes, reactive dyes, and basic dyes are usable.

When the pigment is used as the colorant, the ink composition according to the present invention may contain any pigment which has hitherto been used in water-based ink compositions for ink jet recording. For example, organic pigments or inorganic pigments, which have hitherto been used in ink compositions for ink jet recording, can be used as the pigment. The pigment may be added, to the ink composition, as a resin dispersed pigment obtained by dispersing the pigment together with a dispersant such as a water soluble resin or a surfactant, or as a surface treatment pigment obtained by introducing a hydrophilic group into the surface of a pigment to render the pigment dispersible or dissolvable in an aqueous medium without the aid of any dispersant. When the pigment is dispersed with the aid of a resin dispersant, the above thermoplastic resin may be used as the dispersant. Further, two or more pigments may be used in combination.

The pigment used in the ink composition according to the present invention may be specifically selected according to the description in the column of "I-8-1. Pigment" in connection with the treatment liquid.

The content of the pigment is preferably 0.5 to 15% by weight, more preferably 1.0 to 10.0% by weight, based on the whole ink composition.

III-5. Surfactant

The ink composition according to the present invention preferably comprises a surfactant and/or a low-surface tension organic solvent. The aqueous solution is usually repelled by plastics. However, when a surfactant and/or a low-surface tension organic solvent is added to the aqueous solution, the aqueous solution, that is, the ink composition, can be coated evenly on the plastic surface. It is considered that, upon the evaporation of water from the evenly coated ink composition, the heterocyclic ketone compound and the like are fixed adequately on the surface of the plastic and can dissolve the plastic surface only in its desired area. Further, when the ink composition is evenly coated, the resin contained in the ink composition can also be brought to an even film on the plastic film surface.

The surfactant used in the ink composition according to the present invention may be specifically selected according to the description in the column of "I-2. Surfactant" in connection with the treatment liquid.

The content of the surfactant in the ink composition is not particularly limited so far as the ink composition can be coated evenly on the plastic surface, and the surfactant content may be properly selected depending upon the type of the surfactant used and the type and amount of other ingredients constituting the ink composition. The content of the surfactant may be, for example, 0.01 to 5.0% by weight, preferably 1.0 to 2.0% by weight, based on the total amount of the ink composition.

III-6. Low-Surface Tension Organic Solvent

In order to coat the heterocyclic ketone compound and the cyclic ether compound evenly on the plastic surface, the ink composition according to the present invention may contain a low-surface tension organic solvent instead of or in addition to the surfactant.

The low-surface tension organic solvent used in the ink composition according to the present invention may be specifically selected according to the description in the column of "I-3. Low-surface tension organic solvent" in connection with the treatment liquid.

The content of the low-surface tension organic solvent in the ink composition according to the present invention is not particularly limited, so far as the cyclic ketone compound and the like can be evenly coated onto the surface of plastic, and may be properly selected according to the kind and amount of the heterocyclic ketone compound, cyclic ether compound and the surfactant used. The content of the low-surface tension organic solvent may be, for example, 0 to 10.0% by weight, preferably 2.0 to 8.0% by weight, based on the total amount of the ink composition.

Various properties of the ink composition according to the present invention can be properly regulated. In a preferred embodiment of the present invention, the viscosity of the ink composition is preferably not more than 25 mPa·sec, more preferably not more than 10 mPa·sec (25° C.). When the viscosity is in this range, the ink composition can be stably ejected through an ink ejection head. Further, the surface tension of the ink composition according to the present invention can be properly regulated and is preferably approximately in the range of 20.0 to 40.0 mN/m (25° C.), more preferably approximately in the range of 25.0 to 35.0 mN/m.

III-7. Wetting Agent

From the viewpoint of easiness on storage of the ink composition and good handleability of the ink composition in the coating, a conventional wetting agent (a water soluble organic solvent) may be further added to the ink composition according to the present invention. The incorporation of the wetting agent can prevent coagulation and solidification of the resin component caused by the evaporation of water. Consequently, in ink jet coating, clogging of the ink jet head nozzle can be prevented, and ejection stability can be ensured.

The wetting agent used in the ink composition according to the present invention may be specifically selected according to the description in the column of "II-5. Wetting agent" in connection with the treatment liquid.

The content of the wetting agent may be, for example, 0 to 20.0% by weight, preferably 1.0 to 10.0% by weight, based on the total amount of the ink composition. When the wetting agent content is in the above defined range, clogging preventive properties and ejection stability can be ensured. When the wetting agent content is above the upper limit of the above defined range, drying is sometimes unsatisfactory.

III-8. Main Solvent

The ink composition according to the present invention contains a main solvent. In order to coat a water soluble organic solvent containing a heterocyclic ketone compound and optionally a cyclic ether compound thinly and evenly on the surface of plastic, in the present invention, the heterocyclic ketone compound and the like are diluted with a main solvent before coating. For example, water or a water-soluble organic solvent is usable as the main solvent. In the present invention, water is preferred, for example, from the viewpoint of safety.

Accordingly, in the ink composition according to the present invention, the main solvent is preferably water. Water may be pure water obtained by ion exchange, ultrafiltration, reverse osmosis, distillation or the like, or ultrapure water from the viewpoint of minimizing ionic impurities. Water, which has been sterilized, for example, by ultraviolet irradiation or by addition of hydrogen peroxide, is suitable, because this treatment can prevent the growth of mold or bacteria and, thus, the ink composition can be stored for a long period of time.

III-9. Other Ingredients

When the ink composition according to the present invention contains the above ingredients, a desired effect can be attained. If necessary, the ink composition may further comprise preservatives or fungicides, pH adjustors, dissolution aids, antioxidants, nozzle clogging preventive agents and the like.

These other ingredients used in the ink composition according to the present invention may be specifically selected according to the description in the column of "I-5. Other ingredients" in connection with the treatment liquid.

III-10. Production of Ink Composition

The ink composition according to the present invention may be prepared by properly mixing, in any order, the above ingredients individually, or through the form of a pigment dispersant or resin emulsion for dissolution or dispersion, and optionally filtering the solution or dispersion liquid to remove impurities.

In the ink composition according to the present invention, the mixing amounts of the above ingredients can be properly determined so as to satisfy requirements, for example, that the heterocyclic ketone compound and the cyclic ether compound are used in such an amount that the ink composition can dissolve the surface of the plastic; the viscosity and surface tension are such that the ink composition can be ejected through an ink jet recording head; the ink composition is not coagulated or solidified in a storage container or in nozzles in an ink jet head; and members in contact with liquids in an ink jet printer are not dissolved in or broken by the ink composition. For example, the ink composition typically has the following composition:

| | |
|---|---|
| Cyclic ester compound | 0.1 to 10.0% by weight; |
| Cyclic ether compound | 0.1 to 10.0% by weight; |
| Thermoplastic resin | 0.1 to 15.0% by weight (solid content); |
| Pigment | 0.5 to 15.0% by weight; |
| Surfactant | 0.01 to 5.0% by weight; |
| Low-surface tension organic solvent | 0 to 10.0% by weight; |
| Wetting agent and | 0 to 20.0% by weight; |
| Water | Balance. |

The following composition may be mentioned as another example of the ink composition.

| | |
|---|---|
| Cyclic amide compound | 0.1 to 20.0% by weight; |
| Cyclic ether compound | 0.1 to 10.0% by weight; |
| Thermoplastic resin | 0.1 to 15.0% by weight (solid content); |
| Pigment | 0.5 to 15.0% by weight; |
| Surfactant | 0.01 to 5.0% by weight; |
| Low-surface tension organic solvent | 0 to 10.0% by weight; |
| Wetting agent and | 0 to 20.0% by weight; |
| Water | Balance. |

Accordingly, in one preferred embodiment of the present invention, in the ink composition, the content of the cyclic ester compound is 0.1 to 10.0% by weight, the content of the cyclic ether compound is 0.1 to 10.0% by weight in terms of solid content, and the content of the thermoplastic resin is 0.1 to 15.0% by weight in terms of solid content.

Accordingly, in another preferred embodiment of the present invention, in the ink composition, the content of the cyclic amide compound is 0.1 to 20.0% by weight, the content of the cyclic ether compound is 0.1 to 10.0% by weight in terms of solid content, and the content of the thermoplastic resin is 0.1 to 15.0% by weight in terms of solid content.

III-10. Recording Method Using Ink Composition According to the Present Invention As described above, the ink jet recording method according to the third aspect of the present invention comprises ejecting and depositing droplets of an ink composition onto a recording medium having a recording face formed of a plastic film to perform printing. In the ink composition according to the present invention, the amount of the ingredient capable of dissolving the plastic film is regulated depending upon the state of the plastic film as the recording medium and the type of the material for the plastic film and on ink drying conditions. Accordingly, the coverage of the ink can be properly varied depending upon the reproducibility of the image.

In a preferred embodiment of the present invention, the method for ink jet recording according to the third aspect of the present invention further comprises the step of heating the ink composition deposited on the recording face to form a resin film. It is considered that, in the course of this operation, the heterocyclic ketone compound and cyclic ether compound contained in the ink composition can be evaporated, and, thus, the adhesion between the plastic and the formed resin film can also be further improved. In this case, the heating may be carried out by conventional heating means, for example, a conventional heating device such as an infrared heating device or a hot air heating device according to a conventional method. In the present invention, preferably, the heat treatment in the heating step is carried out by heating with a heater or by warm air drying. Heating conditions are not particularly limited, so far as the resin contained in the ink composition can be cured upon heating to form a resin film, and may be properly determined by taking into consideration, for example, the type of resin particles. For example, in the case of heating with a heater or warm air drying, heating may be carried out at 25 to 90° C., preferably 40 to 70° C., for one min to one day, preferably 3 min to 18 hr.

According to another aspect of the present invention, there is provided a printed matter printed by a method for ink jet recording according to the present invention.

In a further aspect of the present invention, there is provided use of a cyclic ester compound of formula (1) according to claim 1 or a cyclic amide compound of formula (2), in the production of a treatment liquid, a primer liquid for printing, or an ink composition for use in an ink jet recording medium having a recording face of a plastic film.

EXAMPLES

The present invention is further illustrated by the following Examples that are not intended as a limitation of the invention.

A. Treatment Liquid (Cyclic Ester Compound)
A-1. Preparation of Treatment Liquids Treatment liquids according to the present invention were prepared according to the following formulations.

| Treatment liquid 1e: | |
|---|---|
| γ-Butyrolactone | 10.0% by weight |
| Diethylene glycol monobutyl ether | 3.0% by weight |
| Surfynol 465 | 1.0% by weight |
| Pure water | Balance |
| Treatment liquid 2e: | |
| Propylene carbonate | 15.0% by weight |
| Diethylene glycol monobutyl ether | 3.0% by weight |
| Surfynol 465 | 1.0% by weight |
| Pure water | Balance |

A-2. Preparation of Water-Based Pigment Ink Compositions

Water-based pigment ink compositions were prepared according to the following formulation.

| Black ink: | |
|---|---|
| Carbon Black MA7 (manufactured by Mitsubishi Kasei Corp.) | 5.0% by weight |
| Styrene-acrylic acid copolymer (thermoplastic resin) | 2.5% by weight (solid basis) |
| Glycerin | 3.0% by weight |
| Diethylene glycol | 4.0% by weight |
| Diethylene glycol monobutyl ether | 3.0% by weight |
| 2-pyrrolidone | 3.0% by weight |
| Surfynol 465 | 1.0% by weight |
| Pure water | Balance |
| Cyan ink: | |
| C.I. Pigment Blue 15:3 | 2.0% by weight |
| Styrene-acrylic acid copolymer (thermoplastic resin) | 1.0% by weight (solid basis) |
| Glycerin | 3.0% by weight |
| Diethylene glycol | 6.0% by weight |
| Diethylene glycol monobutyl ether | 3.0% by weight |
| 2-Pyrrolidone | 3.0% by weight |
| Surfynol 465 | 1.0% by weight |
| Pure water | Balance |
| Magenta ink: | |
| C.I. Pigment Red 122 | 3.0% by weight |
| Styrene-acrylic acid copolymer (thermoplastic resin) | 1.5% by weight (solid basis) |
| Glycerin | 3.0% by weight |
| Diethylene glycol | 5.0% by weight |
| Diethylene glycol monobutyl ether | 3.0% by weight |
| 2-Pyrrolidone | 3.0% by weight |
| Surfynol 465 | 1.0% by weight |
| Pure water | Balance |
| Yellow ink: | |
| C.I. Pigment Yellow 74 | 2.0% by weight |
| Styrene-acrylic add copolymer (thermoplastic resin) | 1.0% by weight (solid basis) |
| Glycerin | 3.0% by weight |
| Diethylene glycol | 6.0% by weight |
| Diethylene glycol monobutyl ether | 3.0% by weight |
| 2-Pyrrolidone | 3.0% by weight |
| Surfynol 465 | 1.0% by weight |
| Pure water | Balance |

A-3. Evaluation Test

Preparation of Printing Samples (Examples A1 to A5)

Treatment liquid 1e or treatment liquid 2e was coated at 50% duty onto a non-surface-treated flexible vinyl chloride film (Scotchcal Film, manufactured by Sumitomo 3M Ltd.) for ink jet printing, with an ink jet printer (TM-J8000; manufactured by Seiko Epson Corporation). Thereafter, the coated film was dried until the water was removed by evaporation in a thermostatic chamber kept at a temperature of 60° C. and a relative humidity of 20% for one min. Immediately after that, a 100% duty pattern was printed with an ink jet printer (TM-J8000; manufactured by Seiko Epson Corporation) loaded with a black ink or with a cyan ink, a magenta ink, and a yellow ink.

Printing samples were dried in a thermostatic chamber kept at a temperature of 60° C. and a relative humidity of 20% for one hr and further at room temperature for one day and were then subjected to the following evaluation tests.

Preparation of Printing Samples (Examples A6 to A9 (Comparative Examples))

Printing was performed at 100% duty on the flexible vinyl chloride film (not coated with the treatment liquid) as described in Example A1 with an ink jet printer (TM-J8000; manufactured by Seiko Epson Corporation) loaded with a black ink or with a cyan ink, a magenta ink, and a yellow ink. The printed matters thus obtained were dried at a temperature of 60° C. and a relative humidity 20% in a thermostatic chamber for one hr and further at room temperature for one day and were then subjected to the following evaluation tests.

Evaluation of Samples

Evaluation 1: Rubbing Resistance and Scratch Resistance

The sample was subjected to a pencil test with pencils having respective hardnesses by a 750 g-load pencil scratch tester (manufactured by Imoto Machinary Co., Ltd.) specified in ES K 5600-5-4 and was then inspected for the removal of the printed film, that is, scratch damage (cohesive failure). The results were evaluated according to the following criteria.

A: Upon a scratch test with a pencil having hardness HB, no scratch damage was observed, and the primer coating film was not exposed.

B: Upon a scratch test with a pencil having hardness HB, scratch damage on such a level that the primer coating film was exposed, was observed, whereas, upon a scratch test with a pencil having hardness B, no scratch damage was observed, and the primer coating film was not exposed.

C: Upon a scratch test with a pencil having hardness B, scratch damage on such a level that the primer coating film was exposed, was observed.

Evaluation 2: Adhesion

A pressure-sensitive adhesive tape (Cello-Tape No. 252; manufactured by Sekisui Chemical Co., Ltd.) was applied to the printing sample in its printed part and was rubbed twice or thrice with a finger. Thereafter, the pressure-sensitive adhesive tape was separated from the printing sample. The rubbed printed part was visually inspected. The results were evaluated according to the following criteria.

A: No separation of the ink (colorant) from the vinyl chloride film.

B: Partial separation of the ink (colorant) from the vinyl chloride film.

C: Complete separation of the ink (colorant) from the vinyl chloride film.

Evaluation 3: Waterfastness

One drop of tap water was deposited on the printing sample in its printed part, and the sample was allowed to stand for one min. The water droplet was wiped off with gauze. After the wiping-off of the water droplet, the state of the printed part and the state of the gauze were visually inspected. The results were evaluated according to the following criteria.

A: The ink (colorant) was not separated from the vinyl chloride film at all, and no coloration of the gauze was observed.

B: A part of the ink (colorant) was separated from the vinyl chloride film, and coloration of the gauze was observed.

C: The ink (colorant) was completely separated from the vinyl chloride film, and coloration of the gauze was observed.

The results were as shown in Table 1 below.

TABLE 1

| | Treatment liquid | Water-based pigment ink composition | Evaluation 1 | Evaluation 2 | Evaluation 3 |
|---|---|---|---|---|---|
| Example A1 | Treatment liquid 1e | Black ink | A | A | A |
| Example A2 | Treatment liquid 2e | Black ink | A | A | A |
| Example A3 | Treatment liquid 1e | Cyan ink | A | A | A |
| Example A4 | Treatment liquid 1e | Magenta ink | A | A | A |
| Example A5 | Treatment liquid 1e | Yellow ink | A | A | A |
| Example A6 (comparative) | None | Black ink | C | B | C |
| Example A7 (comparative) | None | Cyan ink | A | B | B |
| Example A8 (comparative) | None | Magenta ink | B | B | C |
| Example A9 (comparative) | None | Yellow ink | B | C | C |

B. Treatment Liquid (Cyclic Amide Compound)

B-1. Preparation of Treatment Liquids

Treatment liquids according to the present invention were prepared according to the following formulations.

| Treatment liquid 1a: | |
|---|---|
| 2-Pyrrolidone | 10.0% by weight |
| ε-Caprolactam | 15.0% by weight |
| Diethylene glycol monobutyl ether | 3.0% by weight |
| Surfynol 465 | 1.0% by weight |
| Pure water | Balance |
| Treatment liquid 2a: | |
| N-Methyl-2-pyrrolidone | 10.0% by weight |
| ε-Caprolactam | 15.0% by weight |
| Diethylene glycol monobutyl ether | 3.0% by weight |
| Surfynol 465 | 1.0% by weight |
| Pure water | Balance |

B-2. Preparation of Water-Based Pigment Ink Compositions

Water-based pigment ink compositions were prepared according to the formulations as described in A-2.

B-3. Evaluation Test

Preparation of Printing Samples (Examples B1 to B5)

Treatment liquid 1e or treatment liquid 2e was coated at 50% duty onto a non-surface-treated specialty flexible vinyl chloride film (Scotchcal Film, manufactured by Sumitomo 3M Ltd.) for ink jet printing, with an ink jet printer (TM-J8000; manufactured by Seiko Epson Corporation). Thereafter, the coated film was dried until the water was removed by evaporation in a thermostatic chamber kept at a temperature of 60° C. and a relative humidity of 20% for 5 min. Immediately after that, a 100% duty pattern was printed with an ink jet printer (TM-J8000; manufactured by Seiko Epson Corporation) loaded with a black ink or with a cyan ink, a magenta ink, and a yellow ink.

Printing samples were dried in a thermostatic chamber kept at a temperature of 60° C. and a relative humidity of 20% for one hr and further at room temperature for one day and were then subjected to the following evaluation tests.

Preparation of Printing Samples (Examples B6 to B9 (Comparative Examples))

Printing samples of Examples B6 to B9 were prepared in the same manner as in Examples A6 to A9. The printing samples were dried in a thermostatic chamber kept at a temperature of 60° C. and a relative humidity of 20% for one hr and further at room temperature for one day and were then subjected to the following evaluation tests.

Evaluation of Samples

The samples were evaluated in the same manner as in evaluations 1 to 3 in A-3 above.

The results were as shown in Table 2 below.

TABLE 2

|  | Treatment liquid | Water-based pigment ink composition | Evaluation 1 | Evaluation 2 | Evaluation 3 |
|---|---|---|---|---|---|
| Example B1 | Treatment liquid 1a | Black ink | A | A | A |
| Example B2 | Treatment liquid 2a | Black ink | A | A | A |
| Example B3 | Treatment liquid 1a | Cyan ink | A | A | A |
| Example B4 | Treatment liquid 1a | Magenta ink | A | A | A |
| Example B5 | Treatment liquid 1a | Yellow ink | A | A | A |
| Example B6 (comparative) | None | Black ink | C | B | C |
| Example B7 (comparative) | None | Cyan ink | A | B | B |
| Example B8 (comparative) | None | Magenta ink | B | B | C |
| Example B9 (comparative) | None | Yellow ink | B | C | C |

C. Primer Liquid (Cyclic Ester Compound)

C-1. Preparation of Primer Liquids

Primer liquids according to the present invention were prepared according to the following formulations.

| Primer liquid 1e: | |
|---|---|
| γ-Butyrolactone | 5.0% by weight |
| Styrene-acrylic acid copolymer | 5.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

| Primer liquid 2e: | |
|---|---|
| Propylene carbonate | 5.0% by weight |
| Styrene-acrylic acid copolymer | 5.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

C-2. Preparation of Water-Based Pigment Ink Compositions

Water-based pigment ink compositions were prepared according to the formulations as described in A-2.

C-3. Evaluation Test

Preparation of Printing Samples (Examples C1 to C5)

Primer liquid 1e or primer liquid 2e was coated at 50% duty onto a non-surface-treated specialty flexible vinyl chloride film (Scotchcal Film, manufactured by Sumitomo 3M Ltd.) for ink jet printing, with an ink jet printer (TM-38000; manufactured by Seiko Epson Corporation). Thereafter, the coated film was dried in a thermostatic chamber kept at a temperature of 60° C. and a relative humidity of 20% for one hr to form a primer film. A 100% duty pattern was then printed with an ink jet printer (TM-38000; manufactured by Seiko Epson Corporation) loaded with a black ink or with a cyan ink, a magenta ink, and a yellow ink.

Printing samples were dried in a thermostatic chamber kept at a temperature of 60° C. and a relative humidity of 20% for one hr and further at room temperature for one day and were then subjected to the following evaluation tests.

Preparation of Printing Samples (Examples C6 to C9 (Comparative Examples))

Printing was performed at 100% duty on the flexible vinyl chloride film (not coated with the primer liquid) as described in Example C1 with an ink jet printer (TM-38000; manufactured by Seiko Epson Corporation) loaded with a black ink or with a cyan ink, a magenta ink, and a yellow ink. The printed matters thus obtained were dried at a temperature of 60° C. and a relative humidity 20% in a thermostatic chamber for one hr and further at room temperature for one day and were then subjected to the following evaluation tests.

Evaluation of Samples

The samples were evaluated in the same manner as in evaluations 1 to 3 in A-3 above.

The results were as shown in Table 3 below.

TABLE 3

|  | Primer liquid | Water-based pigment ink composition | Evaluation 1 | Evaluation 2 | Evaluation 3 |
|---|---|---|---|---|---|
| Example C1 | Primer liquid 1e | Black ink | A | A | A |
| Example C2 | Primer liquid 2e | Black ink | A | A | A |
| Example C3 | Primer liquid 1e | Cyan ink | A | A | A |
| Example C4 | Primer liquid 1e | Magenta ink | A | A | A |
| Example C5 | Primer liquid 1e | Yellow ink | A | A | A |
| Example C6 (comparative) | None | Black ink | C | B | C |
| Example C7 (comparative) | None | Cyan ink | A | B | B |
| Example C8 (comparative) | None | Magenta ink | B | B | C |
| Example C9 (comparative) | None | Yellow ink | B | C | C |

D. Primer Liquid (Cyclic Amide Compound)

D-1. Preparation of Primer Liquids

Primer liquids according to the present invention were prepared according to the following formulations.

| Primer liquid 1a: | |
|---|---|
| 2-Pyrrolidone | 10.0% by weight |
| ε-Caprolactam | 10.0% by weight |
| Styrene-acrylic acid copolymer | 5.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

| Primer liquid 2a: | |
|---|---|
| N-Methyl-2-pyrrolidone | 10.0% by weight |
| ε-Caprolactam | 10.0% by weight |
| Styrene-acrylic acid copolymer | 5.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

D-2. Preparation of Water-Based Pigment Ink Compositions

Water-based pigment ink compositions were prepared according to the formulations as described in A-2.

D-3. Evaluation Test

Preparation of Printing Samples (Examples D1 to D5)

Treatment liquid 1a or treatment liquid 2a was coated at 50% duty onto a non-surface-treated specialty flexible vinyl chloride film (Scotchcal Film, manufactured by Sumitomo 3M Ltd.) for ink jet printing, with an ink jet printer (TM-38000; manufactured by Seiko Epson Corporation). Thereafter, the coated film was dried in a thermostatic chamber kept at a temperature of 60° C. and a relative humidity of 20% for one hr to form a primer film. Immediately after that, a 100% duty pattern was printed with an ink jet printer (TM-J8000; manufactured by Seiko Epson Corporation) loaded with a black ink or with a cyan ink, a magenta ink, and a yellow ink.

Printing samples were dried in a thermostatic chamber kept at a temperature of 60° C. and a relative humidity of 20% for one hr and further at room temperature for one day and were then subjected to the following evaluation tests.

Preparation of Printing Samples (Examples D6 to D9 (Comparative Examples))

Printing samples of Examples D6 to D9 were prepared in the same manner as in Examples C6 to C9. The printing samples were dried in a thermostatic chamber kept at a temperature of 60° C. and a relative humidity of 20% for one hr and further at room temperature for one day and were then subjected to the following evaluation tests.

Evaluation of Samples

The samples were evaluated in the same manner as in evaluations 1 to 3 in A-3 above.

The results were as shown in Table 4 below.

TABLE 4

| | Primer liquid | Water-based pigment ink composition | Evaluation 1 | Evaluation 2 | Evaluation 3 |
|---|---|---|---|---|---|
| Example D1 | Primer liquid 1a | Black ink | A | A | A |
| Example D2 | Primer liquid 2a | Black ink | A | A | A |
| Example D3 | Primer liquid 1a | Cyan ink | A | A | A |
| Example D4 | Primer liquid 1a | Magenta ink | A | A | A |
| Example D5 | Primer liquid 1a | Yellow ink | A | A | A |
| Example D6 (comparative) | None | Black ink | C | B | C |
| Example D7 (comparative) | None | Cyan ink | A | B | B |
| Example D8 (comparative) | None | Magenta ink | B | B | C |
| Example D9 (comparative) | None | Yellow ink | B | C | C |

E. Ink Composition Liquid (Cyclic Ester Compound)

E-1. Preparation of Ink Compositions

Ink compositions 1e to 7e were prepared according to the following formulations.

| Ink composition 1e: | |
|---|---|
| γ-Butyrolactone | 2.0% by weight |
| Tetra hydrofuran | 3.0% by weight |
| C.I. Pigment Yellow | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

| Ink composition 2e: | |
|---|---|
| γ-Butyrolactone | 2.0% by weight |
| 1,4-Dioxane | 3.0% by weight |
| C.I. Pigment Yellow | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

| Ink composition 3e: | |
|---|---|
| Propylene carbonate | 2.0% by weight |
| Tetra hydrofuran | 3.0% by weight |
| C.I. Pigment Yellow 74 | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

| Ink composition 4e: | |
|---|---|
| Propylene carbonate | 2.0% by weight |
| 1,4-Dioxane | 3.0% by weight |
| C.I. Pigment Yellow 74 | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

| Ink composition 5e (comparative example): | |
|---|---|
| γ-Butyrolactone | 2.0% by weight |
| C.I. Pigment Yellow 74 | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

| Ink composition 6e (comparative example): | |
|---|---|
| Tetra hydrofuran | 3.0% by weight |
| C.I. Pigment Yellow 74 | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

| Ink composition 7e (comparative example): | |
|---|---|
| C.I. Pigment Yellow 74 | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

E-3. Evaluation Test

Preparation of Printing Samples

Printing samples were prepared using the ink compositions prepared in the above Examples and Comparative Examples. Specifically, printing was performed at 100% duty on a non-surface-treated specialty flexible vinyl chloride film (Scotchcal Film, manufactured by Sumitomo 3M Ltd.) for ink jet recording with an ink jet printer (TM-38000; manufactured by Seiko Epson Corporation) loaded with an ink composition. The printing samples thus obtained were dried at a temperature of 60° C. and a relative humidity 20% in a thermostatic chamber for one hr and further at room temperature for one day and were then subjected to the following evaluation tests.

Evaluation of Samples:
Evaluation a: Adhesion
A pressure-sensitive adhesive tape (Cello-Tape No. 252; manufactured by Sekisui Chemical Co., Ltd.) was applied to the printing sample in its printed part and was rubbed twice or thrice with a finger. Thereafter, the pressure-sensitive adhesive tape was separated from the printing sample. The rubbed printed part was visually inspected. The results were evaluated according to the following criteria.
- A: No separation of the ink (colorant) from the vinyl chloride film.
- B: Partial separation of the ink (colorant) from the vinyl chloride film.
- C: Complete separation of the ink (colorant) from the vinyl chloride film.

Evaluation b: Waterfastness
One drop of tap water was deposited on the printing sample in its printed part, and the sample was allowed to stand for one min. The water droplet was wiped off with gauze. After the wiping-off of the water droplet, the state of the printed part and the state of the gauze were visually inspected. The results were evaluated according to the following criteria.
- A: The ink (colorant) was not separated from the vinyl chloride film at all, and no coloration of the gauze was observed.
- B: A part of the ink (colorant) was separated from the vinyl chloride film, and coloration of the gauze was observed.
- C: The ink (colorant) was completely separated from the vinyl chloride film, and coloration of the gauze was observed.

The results were as shown in Table 5 below.

TABLE 5

| Ink composition | Cyclic ester compound | Cyclic ether compound | Evaluation 1 | Evaluation 2 |
|---|---|---|---|---|
| 1e | γ-Butyrolactone | Tetrahydrofuran | A | A |
| 2e | γ-Butyrolactone | 1,4-Dioxane | A | A |
| 3e | Propylene carbonate | Tetrahydrofuran | A | A |
| 4e | Propylene carbonate | 1,4-Dioxane | A | A |
| 5e (Comparative Example) | γ-Butyrolactone | None | B | B |
| 6e (Comparative Example) | None | Tetrahydrofuran | B | B |
| 7e (Comparative Example) | None | None | C | C |

F. Ink Composition Liquid (Cyclic Amide Compound)
F-1. Preparation of Ink Compositions
Ink compositions 1a to 7a were prepared according to the following formulations.

Ink composition 1a:

| | |
|---|---|
| 2-Pyrrolidone | 5.0% by weight |
| ε-Caprolactam | 5.0% by weight |
| Tetra hydrofura n | 3.0% by weight |
| C.I. Pigment Yellow 74 | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

Ink composition 2a:

| | |
|---|---|
| 2-Pyrrolidone | 5.0% by weight |
| ε-Caprolactam | 5.0% by weight |
| 1,4-Dioxane | 3.0% by weight |
| C.I. Pigment Yellow 74 | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

Ink composition 3a:

| | |
|---|---|
| N-Methyl-2-pyrrolidone | 5.0% by weight |
| ε-Caprolactam | 5.0% by weight |
| Tetra hydrofura n | 3.0% by weight |
| C.I. Pigment Yellow 74 | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

Ink composition 4a:

| | |
|---|---|
| N-Methyl-2-pyrrolidone | 5.0% by weight |
| ε-Caprolactam | 5.0% by weight |
| 1,4-Dioxane | 3.0% by weight |
| C.I. Pigment Yellow 74 | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

Ink composition 5a (comparative example):

| | |
|---|---|
| 2-Pyrrolidone | 5.0% by weight |
| ε-Caprolactam | 5.0% by weight |
| C.I. Pigment Yellow 74 | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

Ink composition 6a (comparative example):

| | |
|---|---|
| Tetrahydrofuran | 3.0% by weight |
| C.I. Pigment Yellow 74 | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

Ink composition 7a (comparative example):

| | |
|---|---|
| C.I. Pigment Yellow 74 | 2.0% by weight |
| Styrene-acrylic acid copolymer (thermoplastic resin) | 1.0% by weight (solid basis) |
| Diethylene glycol | 4.0% by weight |
| Diethylene glycol monobutyl ether | 3.0% by weight |
| Surfynol 465 | 1.0% by weight |
| Pure water | Balance |

F-3. Evaluation Test
In the same manner as in E-3, printing samples were prepared and were evaluated.

The results were as shown in Table 6 below.

TABLE 6

| Ink composition | Cyclic amide compound | Cyclic ether compound | Evaluation 1 | Evaluation 2 |
|---|---|---|---|---|
| 1a | 2-Pyrrolidone ε-Caprolactam | Tetrahydrofuran | A | A |
| 2a | 2-Pyrrolidone ε-Caprolactam | 1,4-Dioxane | A | A |
| 3a | N-Methyl-2-pyrrolidone ε-Caprolactam | Tetrahydrofuran | A | A |
| 4a | N-Methyl-2-pyrrolidone ε-Caprolactam | 1,4-Dioxane | A | A |
| 5a (Comparative Example) | 2-Pyrrolidone ε-Caprolactam | None | A | A |
| 6a (Comparative Example) | None | Tetrahydrofuran | B | B |
| 7a (Comparative Example) | None | None | C | C |

The invention claimed is:

1. An ink-jet ink composition for forming an image on a recording face formed of a plastic film by dissolving a surface of the plastic film, said ink composition comprising:
    a cyclic ester compound selected from the group consisting of γ-butyrolactone, ε-caprolactone, δ-hexandolactone, propylene carbonate, ethylene carbonated, and 1,3-dioxin-2-one,
    a thermoplastic resin;
    a cyclic ether compound selected from the group consisting of oxirane, oxacyclobutane (oxetane), tetrahydrofuran (oxolane), 3-methyl-oxolane, oxane, 1,3-dioxolane, 1,3-dioxane, 1,4-dioxane, 2-methyltetrahydrofuran, and 1,3,5-trioxane,
    a colorant; and
    a main solvent,
    wherein the plastic film is selected from polyvinyl chloride, polyethylene terephthalate, polycarbonate, polystyrene and polyurethane,
    where when the ink-jet ink composition is deposited onto the plastic film, the ink-jet ink composition dissolves the plastic film,
    wherein the content of the cyclic ester compound is 0.1% to 10.0% by weight based on the total amount of the ink-jet composition, and
    wherein the content of the cycler ether compound is 0.1% to 10.0% by weight based on the total amount of the ink-jet ink composition.

2. The ink jet ink composition according to claim 1, wherein said cyclic ester compound is selected from the group consisting of γ-butyrolactone, ε-caprolactone, propylene carbonate, and ethylene carbonate.

3. The ink-jet ink composition according to claim 1, which further comprises a surfactant and wherein said surfactant is an acetylene glycol surfactant.

4. The ink-jet ink composition according to claim 1, which further comprises an organic solvent having low surface tension, and wherein said organic solvent having low surface tension is diethylene glycol monobutyl ether or triethylene glycol monobutyl ether.

5. The ink-jet ink composition according to claim 1, wherein the plastic film to which the ink-jet ink composition is deposited has no ink-receiving layer.

6. The ink-jet ink composition according to claim 1, wherein the thermoplastic resin is dispersed in the ink-jet ink composition.

7. The ink-jet ink composition according to claim 1, wherein the ink-jet composition further comprises a compound represented by general formula (2):

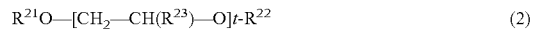

$$R^{21}O\text{—}[CH_2\text{—}CH(R^{23})\text{—}O]t\text{-}R^{22} \qquad (2)$$

wherein $R^{21}$ and $R^{22}$ each independently represent a hydrogen atom or an alkyl group having 3 to 6 carbon atoms, $R^{23}$ represents a hydrogen atom or an alkyl group having 1 to 4 carbon atoms and t is an integer of 1 to 8, provided that at least one of $R^{21}$ and $R^{22}$ is an alkyl group having 3 to 6 carbon atoms.

8. The ink-jet ink composition according to claim 1, wherein the thermoplastic resin is a styrene-acrylic acid copolymer.

9. The ink-jet ink composition according to claim 1, wherein the ink-jet ink composition further comprises a compound capable of dissolving the plastic film other than the cyclic ester compound.

10. The ink-jet ink composition according to claim 1, wherein the plastic film to which the ink-jet composition is deposited is non-surface treated for ink jet printing.

11. The ink-jet ink composition according to claim 1, wherein the cyclic ether compound is selected from the group consisting of tetrahydrofuran, 1,4-dioxane, and 2-methyltetrahydrofuran.

12. The ink-jet ink composition according to claim 1, wherein the cyclic ether compound is selected from the group consisting of tetrahydrofuran and 1,4-dioxane.

13. A method for formulation of an image by ink jet recording, comprising ejecting and depositing droplets of the ink composition according to claim 1 onto a recording medium having a recording face of a plastic film to perform printing.

14. The method according claim 13, which further comprises a heating step of heating the ink composition deposited onto the recording face to form a resin film.

15. The method according to claim 13, wherein the recording face is polyvinyl chloride film.

16. A recorded matter printed by a method according to claim 13.

17. An ink-jet ink composition for forming an image on a recording face formed of a plastic film by dissolving a surface of the plastic film, said ink composition comprising:
    a cyclic ester compound selected from the group consisting of γ-butyrolactone, ε-caprolactone, δ-hexanolactone, propylene carbonate, ethylene carbonate, and 1,3-dioxan-2-one;
    a thermoplastic resin;
    a cyclic ether compound selected from group consisting of oxirane, oxacyclobutane (oxetane), tetrahydrofuran (oxolane), 3-methl-oxolane, oxane, 1,3-dioxolane, 1,3-dioxane, 1,4-dioxane, 2-methyltetrahydrofuran, and 1,3,5-trioxane, in an amount that ranges between 0.5 to 5.0% by weight;
    a colorant; and
    a main solvent,
    wherein the plastic film is selected from polyvinyl chloride, polyethylene terephthalate, polycarbonate, polystyrene and polyurethane,
    wherein when the ink-jet ink composition is deposited onto the plastic film, the ink-jet ink composition dissolves the plastic film, and wherein the content of the cyclic ester compound is 0.1 to 10.0% b weight based on the total amount of the ink-jet ink composition.

* * * * *